(12) United States Patent  
Ishibe

(10) Patent No.: US 7,561,319 B2
(45) Date of Patent: Jul. 14, 2009

(54) OPTICAL SCANNING DEVICE AND IMAGE FORMING APPARATUS USING THE SAME

(75) Inventor: Yoshihiro Ishibe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/165,261

(22) Filed: Jun. 30, 2008

(65) Prior Publication Data

US 2009/0009841 A1    Jan. 8, 2009

(30) Foreign Application Priority Data

Jul. 4, 2007    (JP) ............................. 2007-175909

(51) Int. Cl.
*G02B 26/08*    (2006.01)

(52) U.S. Cl. .................................... 359/207

(58) Field of Classification Search ......... 359/205–208, 359/216–218
See application file for complete search history.

(56) References Cited

U.S. PATENT DOCUMENTS

| | | | |
|---|---|---|---|
| 6,067,106 A | 5/2000 | Ishibe et al. ................ | 347/258 |
| 6,130,768 A * | 10/2000 | Ono ............................ | 359/207 |
| 6,166,842 A | 12/2000 | Aoki et al. .................. | 359/205 |
| 6,166,843 A | 12/2000 | Iizuka ......................... | 359/208 |
| 6,330,524 B1 | 12/2001 | Suzuki et al. ............... | 702/159 |
| 6,596,985 B2 | 7/2003 | Sakai et al. ................. | 250/234 |
| 6,825,870 B2 | 11/2004 | Kato ............................ | 347/258 |
| 6,956,686 B2 | 10/2005 | Koreeda ..................... | 359/207 |
| 6,961,164 B2 | 11/2005 | Atsuumi ..................... | 359/205 |
| 7,149,019 B2 * | 12/2006 | Ishibe ......................... | 359/207 |
| 7,215,354 B1 | 5/2007 | Sakai et al. ................. | 347/244 |
| 2001/0053014 A1 | 12/2001 | Aoki et al. .................. | 359/205 |
| 2004/0156084 A1 | 8/2004 | Takayama ................... | 359/196 |

FOREIGN PATENT DOCUMENTS

| | | |
|---|---|---|
| EP | 967508 | 12/1999 |
| EP | 1677135 | 7/2006 |
| JP | 2001-108927 | 4/2001 |
| JP | 2003-241126 | 8/2003 |
| JP | 2008-32961 | 2/2008 |

OTHER PUBLICATIONS

European Search Report dated Oct. 28, 2008, from corresponding European Application No. 08011935.7.

* cited by examiner

*Primary Examiner*—Euncha P Cherry
(74) *Attorney, Agent, or Firm*—Fitzpatrick, Cella, Harper & Scinto

(57) ABSTRACT

An optical scanning device includes a rotary polygonal mirror, an input optical system for direct a light beam from a light source to a deflecting surface of the rotary polygonal mirror, and an imaging optical system for imaging the deflected light beam on a scan surface, wherein in a main scan section the light beam incident on the deflecting surface has a beam width wider than a width of the deflecting surface, wherein at least one optical surface of at least one imaging optical element of the imaging optical system has a shape in the sub-scan section which shape is a non-arcuate shape including an aspherical coefficient of quartic or higher order, and wherein the aspherical coefficient of quartic or higher order changes in the main-scan direction and from a scan central portion of the imaging optical element to a scan end portion of the imaging optical element.

28 Claims, 15 Drawing Sheets

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is particularly suitably usable in an image forming apparatus such as a laser beam printer (LBP), a digital copying machine or a multifunction printer, for example, having an electrophotographic process.

Various types of optical scanning devices for a laser beam printer (LBP) having an electrophotographic process have conventionally been proposed (see Patent Document No. 1).

FIG. 24 is a sectional view (main-scan sectional view) in the main-scan direction of a main portion of a conventional optical scanning device, and FIG. 25 is a sectional view (sub-scan sectional view) of the main portion of FIG. 24 in the sub-scan direction.

Denoted in the drawing at 1 is light source means which comprises a semiconductor laser having a single light emitting member (light emission point).

The light beam emitted from the light source mans 1 is shaped by an aperture stop 3 and is transformed into a parallel light beam by means of a collimator lens 2. Then, it is converged by a cylindrical lens 4 only in the sub-scan direction. The light beam converged by the cylindrical lens 4 is then imaged into a focal-line shape extending in the main-scan direction, adjacent a deflecting surface (deflective reflection surface) 5a of an optical deflector (rotary polygon mirror) 5 which is deflecting means.

The elements of collimator lens 2 and cylindrical lens 4 described above are components of an input optical system LA.

The light beam scanningly deflected by the rotary polygon mirror 5 which is rotating at a constant angular speed in the direction of an arrow 5b in the drawing, is collected into a spot shape on a scan surface 7 (photosensitive drum) to be scanned, by means of an imaging lens 6a constituting an imaging optical system 6. The light scans the scan surface at a constant speed in the direction of an arrow 7b in the drawing.

It is to be noted here that, in ordinary rotary polygonal mirrors such as at 5 used generally, a plurality of deflecting surfaces 5a thereof are formed at the right angle to the main-scan direction. However, due to a finishing error or the like, these surfaces may have a tilt in the sub-scan direction which causes displacement of the spot on the scan surface 7 in the sub-scan direction.

In order to correct this, the imaging optical system 6 of conventional optical scanning devices uses an anamorphic optical system called a tilt correction optical system, which functions to place the vicinity of the deflecting surface 5a and the scan surface 7 in a conjugate relationship with each other within the sub-scan section.

[Patent Document]

1. Japanese Laid-Open Patent Application No. 2003-241126

In conventional optical scanning devices as described above, the vicinity of the deflecting surface 5a and the scan surface 7 are placed in a conjugate relationship with each other within the sub-scan section in order to correct the tilt of the deflecting surface 5a in the sub-scan direction (called "surface tilt") caused by a by finishing error of the deflecting surfaces 5a of the rotary polygonal mirror 5. Namely, the imaging optical system is comprised of an anamorphic optical system called a tilt correction optical system.

However, in conventional optical scanning devices, the rotational axis of the rotary polygonal mirror 5 is not present on the deflecting surface 5a thereof.

As a result, with the rotation of the deflecting surfaces 5a, there occurs a sag phenomenon that the relative positional relationship between the focal line (line image) being converged only in the sub-scan direction by the cylindrical lens 4 and the deflecting surface 5a changes.

This phenomenon will be described in detail with reference to FIG. 26 through FIG. 29.

FIG. 26 is an enlarged view of a portion around the deflecting surface 5a of FIG. 24. In FIG. 26, denoted at I is the principal ray of a light beam from light source means (now shown) which beam is incident on the rotary polygonal mirror 5.

Illustrated at A, B and C are the rotational states of the rotary polygonal mirror 5, respectively.

Specifically, the state A illustrates the rotary polygonal mirror 5 as a light beam scanningly deflected by the deflecting surface 5a scans a central portion of the scan surface 7 (not shown).

The light beam I from the light source means (not shown) incident on the deflecting surface 5a is reflected at the intersection point P with the deflecting surface 5a, rightwardly in the direction toward A' as viewed in the drawing. Then, it is incident on the imaging optical system 6 (not shown).

The state B illustrates the rotary polygonal mirror 5 as a light beam scanningly deflected by the deflecting surface 5a scans an end portion of the scan surface 7 (not shown) at the input optical system LA side.

The light beam I from the light source means (not shown) incident on the deflecting surface 5a is reflected at the intersection point Q with the deflecting surface 5a to the upper right in the direction toward B' as viewed in the drawing. Then, it is incident on the imaging optical system 6 (not shown).

The state C illustrates the rotary polygonal mirror 5 as a light beam scanningly deflected by the deflecting surface 5a scans an end portion of the scan surface 7 (not shown) at a side remote from the input optical system LA.

The light beam I from the light source means (not shown) incident on the deflecting surface 5a is reflected at the intersection point Q with the deflecting surface 5a to the lower right in the direction toward C' as viewed in the drawing. Then, it is incident on the imaging optical system 6 (not shown).

Here, the refracting power in the sub-scan direction of the cylindrical lens 4 as well as the position thereof are so set that the imaging position (imaging position in the sub-scan direction) of the focal line (line image) imaged by the cylindrical lens 4 is placed approximately at the middle between the point P and the point Q in the drawing.

Furthermore, the focal line imaged by the cylindrical lens 4 and the scan surface 7 are kept in a conjugate relationship with each other by the imaging optical system 6 in the sub-scan section.

With regard to the tilt correction optical system, it has been mentioned that "the vicinity of the deflecting surface 5a and the scan surface 7 are placed in a conjugate relationship with each other in the sub-scan section by the imaging optical system 6".

Here, the reason for specifically mentioning "the vicinity of the deflecting surface 5a" will be explained.

To be exact, as described above, the tilt correction optical system is configured so that the focal line (line image) imaged by the cylindrical lens 4 and the scan surface 7 are placed in a conjugate relationship with each other in the sub-scan section, by the imaging optical system 6.

Furthermore, the tilt correction optical system is so configured that the imaging position of the focal line is disposed in the vicinity of the deflecting surface 5a (in the preceding description, it is approximately at the middle between the points P and Q).

Therefore, the deflecting surface 5a and the scan surface 7 are not exactly made conjugate with each other in the sub-scan section by the imaging optical system 6.

Rather, the focal line which is located in the vicinity of the deflecting surface 5a and the scan surface 7 are placed conjugate with each other in sub-scan section by the imaging optical system 6.

It is to be noted here that the optical arrangement is so set that both the position where the light beam is reflected by the deflecting surface 5a as the deflectively reflected light beam scans the end portion of the scan surface at the input optical system LA side and the position where the light beam is reflected by the deflecting surface 5a as the same scans the end portion of the scan surface which is at a side remote from the input optical system LA, are coincide with the same point Q.

However, it is not always necessary to use such arrangement. For example, the position where the light beam is reflected by the deflecting surface 5a as the deflectively reflected light beam scans the end portion of the scan surface at the input optical system side and the position where the light beam is reflected by the deflecting surface 5a as the same scans the end portion of the scan surface which is at a side remote from the input optical system may be appropriately deviated from each other.

FIG. 27 illustrates the imaging relationship in the sub-scan section when the rotary polygonal mirror 5 of FIG. 26 is in the state A, that is, when the light beam being scanningly deflected is scanning the central portion of the scan surface 7.

As has been explained with reference to FIG. 26, the imaging position (imaging position in the sub-scan direction) of the focal line (line image) imaged by the cylindrical lens 4 (not shown) is placed approximately at the middle between of the points P and Q.

Thus, in FIG. 27, the focal line D (position D of the focal line) of the light beam incident on the deflecting surface 5a from the left in the drawing is located before (left-hand side in the drawing) the deflecting surface 5a. The point P is the position where the light beam incident on the deflecting surface 5a is reflected.

Here, since the focal line D and the scan surface 7 are made conjugate with each other in the sub-scan section by the imaging optical system 6 (imaging lens 6a), the conjugate point in the sub-scan section of the focal line D coincides with the scan surface 7.

In FIG. 27, it is illustrated as D'.

On the other hand, the conjugate point of the point P on the deflecting surface 5a is located in the rightward direction P' of the scan surface 7 in the drawing.

FIG. 28 illustrates the imaging relationship in the sub-scan section when the rotary polygonal mirror 5 of FIG. 26 is in the state B, that is, when the light beam being scanningly deflected is scanning the end portion of the scan surface 7 at the input optical system side.

In FIG. 28, the focal line E (position E of the focal line) of the light beam incident on the deflecting surface 5a from the left in the drawing is located after (right-hand side in the drawing) the deflecting surface 5a. The point Q is the position where the light beam incident on the deflecting surface 5a is reflected.

Here, since the focal line E and the scan surface 7 are made conjugate with each other in the sub-scan section by the imaging optical system 6, the conjugate point in the sub-scan section of the focal line E coincides with the scan surface 7.

In FIG. 28, it is illustrated as E'.

On the other hand, the conjugate point of the point Q on the deflecting surface 5a is located in the leftward direction Q' of the scan surface 7 in the drawing.

FIG. 29 illustrates the imaging relationship in the sub-scan section when the rotary polygonal mirror 5 of FIG. 26 is in the state C, that is, when the light beam being scanningly deflected is scanning the end portion of the scan surface 7 at a side remote from the input optical system.

In FIG. 29, the focal line F (position F of the focal line) of the light beam incident on the deflecting surface 5a from the left in the drawing is located after (right-hand side in the drawing) the deflecting surface 5a. The point Q is the position where the light beam incident on the deflecting surface 5a is reflected.

Here, since the focal line F and the scan surface 7 are made conjugate with each other in the sub-scan section by the imaging optical system 6, the conjugate point in the sub-scan section of the focal line F coincides with the scan surface 7. In FIG. 29, it is illustrated as F'.

On the other hand, the conjugate point of the point Q on the deflecting surface 5a is located in the leftward direction Q' of the scan surface 7 in the drawing.

As described above, the relative positional relationship between the focal line (line image) converged only in the sub-scan direction by the cylindrical lens 4 and the deflecting surface 5a changes with the rotation of the deflecting surface 5a.

It is to be noted here that the focal line and the scan surface 7 have been described above as being in a conjugate relationship with each other in the sub-scan section.

However, if the focal line and the scan surface 7 are completely conjugate in the sub-scan section through the whole effective scan region to be used for the image writing, it means that the field curvature in the sub-scan direction is completely corrected.

Actually, however, in ordinary imaging optical systems 6, the field curvature in the sub-scan direction cannot always be completely corrected, but generally there remains some field curvature.

Thus, although with reference to FIGS. 27-29 the focal line D (focal line E and focal line F) and the scan surface 7 have been described as being made conjugate in the sub-scan section by the imaging optical system 6, actually in ordinary imaging optical systems 6 there remains field curvature in the sub-scan direction and, therefore, focal line D (focal line E and focal line F) and the scan surface 7 are not in a completely conjugate relationship with each other. Generally, a small deviation is present.

FIG. 30 illustrates a tilt error of the deflecting surface 5a of FIG. 27, upward in the sub-scan direction, caused by a finishing error.

In FIG. 30, only the principal ray is illustrated for better understanding.

The light beam incident on the deflecting surface 5a from the left in the drawing is reflected obliquely upwardly at the point P on the deflecting surface 5a which is located at the right-hand side of the focal line D as viewed in the drawing and which has a tilt error produced upwardly in the sub-scan direction.

Then, the light beam reflected obliquely upwardly at the point P on the deflecting surface 5a is directed toward the position P' which is the conjugate point of the point P with respect to the imaging optical system 6.

Thus, the light beam reflected obliquely upwardly at the point P on the deflecting surface 5a arrives at a position on the scan surface 7 which position is deviated upwardly in the sub-scan direction as viewed in the drawing.

Next, FIG. 31 illustrates a tilt error of the deflecting surface 5a of FIG. 28, upward in the sub-scan direction, caused by a finishing error.

In FIG. 31, like FIG. 30, only the principal ray is illustrated.

The light beam incident on the deflecting surface 5a from the left in the drawing is reflected obliquely upwardly at the point Q on the deflecting surface 5a which is located at the left-hand side of the focal line E as viewed in the drawing and which has a tilt error produced upwardly in the sub-scan direction.

Then, the light beam reflected obliquely upwardly at the point Q on the deflecting surface 5a is directed through the position Q' which is the conjugate point of the point Q with respect to the imaging optical system 6, and it arrives at the scan surface 7.

Thus, the light beam reflected obliquely upwardly at the point Q on the deflecting surface 5a arrives at a position on the scan surface 7 which position is deviated downwardly in the sub-scan direction as viewed in the drawing.

Furthermore, FIG. 32 illustrates a tilt error of the deflecting surface 5a of FIG. 29, upward in the sub-scan direction, caused by a finishing error.

In FIG. 32, like FIG. 30, only the principal ray is illustrated.

The light beam incident on the deflecting surface 5a from the left in the drawing is reflected obliquely upwardly at the point Q on the deflecting surface 5a which is located at the left-hand side of the focal line F as viewed in the drawing and which has a tilt error produced upwardly in the sub-scan direction.

Then, the light beam reflected obliquely upwardly at the point Q on the deflecting surface 5a is directed through the position Q' which is the conjugate point of the point Q with respect to the imaging optical system 6, and it arrives at the scan surface 7.

Thus, the light beam reflected obliquely upwardly at the point Q on the deflecting surface 5a arrives at a position on the scan surface 7 which position is deviated downwardly in the sub-scan direction as viewed in the drawing.

Hence, because of the phenomenon described above, the scanning line on the scan surface 7 curves such as shown in FIG. 33.

Hereinafter, the scan line curve due to the tilt of the deflecting surface 5a as described above will be referred to as "scan line curve by the surface tilt".

FIG. 33 illustrates a case where the deflecting surface 5a has a tilt error upward in the sub-scan direction. The scanning line on the scan surface 7 has a scan line curve being convexed in upward direction in the sub-scan direction.

If the deflecting surface 5a has a tilt downward in the sub-scan direction, the scanning line on the scan surface 7 will have a scan line curve being convexed in downward direction in the sub-scan direction.

Therefore, if the deflecting surfaces 5a of the rotary polygonal mirror 5 have different tilt errors being upward or downward in the sub-scan direction, on the scan surface 7 scan lines curved convexed in upward direction in the sub-scan direction and scan lines curved convexed in the downward direction in the sub-scan direction will be repeated periodically.

The result appears as pitch unevenness and it leads to serious deterioration of the print quality.

This phenomenon is inevitable if a rotary polygonal mirror or the like in which the pivotal axis of the deflecting surface as deflecting means is not present on the deflecting surface, is used.

In order to improve the pitch unevenness, generally some measures have been taken: the rotary polygonal mirror is machined very precisely so as to make the surface tilt itself of the rotary polygonal mirror unit small; or alternatively, when the rotary polygonal mirror is mounted on the shaft of a motor or the like, good parallelism of rotational axis of the rotary polygonal mirror with the motor shaft should be kept.

With regard to the period of the pitch unevenness mentioned above, if the resolution of the image is 600 DPI and the number of deflecting surfaces of the rotary polygonal mirror 5 is four (4), then the pitch unevenness can be observed at the following period.

$$25.4/600*4=0.1693 \text{ (mm)}$$

Similarly, if the resolution is 600 DPI and the number of the deflecting surfaces of the rotary polygonal mirror 5 is six (6), then the pitch unevenness can be observed at the following period.

$$25.4/600*6=0.254 \text{ (mm)}$$

Recently, for higher printing speed or higher recording density, a monolithic multi-beam semiconductor laser which is comprised of a plurality of light emitting members (light emission points) is used as light source means.

Furthermore, a plane emission laser (Vertical Cavity Surface Emitting Laser: VCSEL) having a plurality of light emitting members arrayed in a two-dimensional array is used.

If for example the resolution is 600 DPI and a rotary polygonal mirror with six (6) deflecting surfaces is used with a monolithic multi-beam semiconductor laser having four light emitting members disposed along a straight line as light source means, the period of pitch unevenness is given by:

$$25.4/600*6*4=1.016 \text{ (mm)}$$

Similarly, if the resolution is 1200 DPI and a rotary polygonal mirror with six (6) deflecting surfaces is used with a VCSEL having two-dimensional array of 4×4 (total sixteen (16)) light emitting members as light source means, the period of pitch unevenness is given by:

$$25.4/600*6*16=2.032 \text{ (mm)}$$

Generally, from the visible sensitivity characteristic of the visual system of human being, it is known that periodic unevenness in the spatial frequency range of 0.2-4 LinE/mm (0.25-5 mm pitch when converted in terms of pitch) is most conspicuous.

In the first-mentioned example wherein the resolution is 600 DPI and number of the deflecting surfaces of the rotary polygonal mirror 5 is four (4), the period of pitch unevenness is 0.1693 mm. Although this is out of the range of 0.25-5 mm pitch, if a high picture quality is going to be achieved, even with this pitch the frequency is sufficiently conspicuous in light of the human visual characteristics. Hence, the pitch unevenness will be a problem.

If the printing speed and recording density should be improved further, the pitch has to be enlarged and, hence, the observable unevenness would be emphasized more and more.

It is seen from this that, in order to accomplish higher printing speed and higher recording density and to improve the printing quality as well, reducing the pitch unevenness is a crucial key.

The pitch unevenness may be improved by machining the rotary polygonal mirror more precisely so as to make the surface tilt itself of the rotary polygonal mirror unit small, or alternatively, by mounting the rotary polygonal mirror on the motor shaft to assure better parallelism between the rotational axis of the polygonal mirror and the rotational shaft of the motor, as described hereinbefore.

However, there is a limitation in improving the precision, and it is impossible to completely remove the mounting error or assembling error.

On the other hand, the pitch unevenness may be reduced by a method, as disclosed in Patent Document No. 1, that the position where the wavefront aberration in the sub-scan section of a light beam passing along the optical axis of an imaging lens is minimized is placed at the optical deflector side rather than on the scan surface.

More specifically, the conjugate point D' of the focal line D in the sub-scan section in FIG. 27 is placed leftwardly of the scan surface 7 in the drawing and, by doing so, the conjugate point P' of the point P on the deflecting surface 5a is brought closer to the scan surface 7.

This makes it possible to reduce the amount of deviation of the light beam on the scan surface 7 in the sub-scan direction in FIG. 30. As a result, the pitch unevenness can be reduced and the printing quality can be improved.

However, if the pitch unevenness is reduced by placing the conjugate point D' of the focal line D in the sub-scan section leftwardly of the scan surface 7 as viewed in the drawing, as in Patent Document No. 1, the image plane in the sub-scan direction is consequently curved in the minus side (optical deflector side) at the scan central portion.

If the position of the focal line coincides with the deflecting surface, curve of the image plane will be avoided. However, in the case of a rotary polygonal mirror wherein there is no rotational axis on the deflecting surface, the relative position of the deflecting surface and the focal line changes with the rotation of the deflecting surface.

Thus, except a particular scanning position in the effective scan region, the position of the focal line would be assuredly out of coincidence with the deflecting surface.

In other words, if the pitch unevenness is reduced, it necessarily results in sub-scan field curvature in the effective scan region.

SUMMARY OF THE INVENTION

The present invention provides an optical scanning device by which the pitch unevenness can be reduced and the field curvature in the sub-scan direction is controlled small, which is best suited to high speed and high recording density printing, and yet which assures good printing quality. Also, the present invention provides an image forming apparatus having such optical scanning device.

In accordance with an aspect of the present invention, there is provided an optical an optical scanning device, comprising: a light source device; a rotary polygonal mirror having a plurality of deflecting surfaces configured to scanningly deflect a light beam emitted from a light emitting member of said light source device; an input optical system configured to direct the light beam emitted from the light emitting member of said light source device to a deflecting surface of said rotary polygonal mirror; and an imaging optical system configured to image the light beam scanningly deflected by the deflection surface of said rotary polygonal mirror, on a scan surface to be scanned; wherein in a sub-scan section the deflecting surface of said rotary polygonal mirror and the scan surface are placed in a conjugate relationship with each other, wherein in a main scan section the light beam incident on the deflecting surface of said rotary polygonal mirror has a beam width narrower than a width of the deflecting surface of said rotary polygonal mirror, wherein said imaging optical system includes at least one imaging optical element and wherein at least one optical surface of said at least one imaging optical element has a shape in the sub-scan section which shape comprises a non-arcuate shape including an aspherical coefficient of quartic or higher order, wherein the aspherical coefficient of quartic or higher order changes in the main-scan direction and from a scan central portion of the imaging optical element to a scan end portion of the imaging optical element, wherein, in the non-arcuate shape of the imaging optical element in the sub-scan section and at the scan central portion in the main-scan direction, an absolute value of a curvature radius at an end portion of the imaging optical element in the sub-scan direction is larger than an absolute value of a curvature radius at a central portion of the imaging optical element in the sub-scan direction, and wherein, in the non-arcuate shape of the imaging optical element in the sub-scan section and at the scan end portion in the main-scan direction, an absolute value of the curvature radius at the end portion of the imaging optical element in the sub-scan direction is smaller than the absolute value of the curvature radius at the central portion of the imaging optical element in the sub-scan direction.

In accordance with another aspect of the present invention, there is provided an optical scanning device, comprising: a light source device; a rotary polygonal mirror having a plurality of deflecting surfaces configured to scanningly deflect a light beam emitted from a light emitting member of said light source device; an input optical system configured to direct the light beam emitted from the light emitting member of said light source device to a deflecting surface of said rotary polygonal mirror; and an imaging optical system configured to image the light beam scanningly deflected by the deflection surface of said rotary polygonal mirror, on a scan surface to be scanned; wherein in a sub-scan section the deflecting surface of said rotary polygonal mirror and the scan surface are placed in a conjugate relationship with each other, wherein in a main scan section the light beam incident on the deflecting surface of said rotary polygonal mirror has a beam width narrower than a width of the deflecting surface of said rotary polygonal mirror, wherein said imaging optical system includes at least one imaging optical element and wherein at least one optical surface of said at least one imaging optical element has a shape in the sub-scan section which shape comprises a non-arcuate shape including an aspherical coefficient of quartic or higher order, wherein the aspherical coefficient of quartic or higher order changes in dependence upon a coordinate of the imaging optical element in the main-scan direction, wherein the change is such that a wave surface imaged on the scan surface in the sub-scan section when a scan central portion of the scan surface in the main-scan direction is scanned is delayed at an end portion in the sub-scan direction and with respect to an advancement direction of the wave surface, relative to a reference spherical surface around a paraxial image point in the sub-scan direction, and wherein the change is such that the wave surface imaged on the scan surface in the sub-scan section when a scan end portion of the scan surface in the main-scan direction is scanned goes ahead at the end portion in the sub-scan direction and with respect to the advancement direction of the wave surface, relative to the reference spherical surface around the paraxial image point in the sub-scan direction.

In accordance with a further aspect of the present invention, there is provided an optical scanning device, comprising: a light source device; a rotary polygonal mirror having a plurality of deflecting surfaces configured to scanningly deflect a light beam emitted from a light emitting member of said light source device; an input optical system configured to direct the light beam emitted from the light emitting member of said light source device to a deflecting surface of said rotary polygonal mirror; and an imaging optical system configured to image the light beam scanningly deflected by the deflection surface of said rotary polygonal mirror, on a scan surface to be scanned; wherein in a sub-scan section the deflecting surface of said rotary polygonal mirror and the scan surface are placed in a conjugate relationship with each other, wherein in a main scan section the light beam incident on the deflecting surface of said rotary polygonal mirror has a beam width wider than a width of the deflecting surface of said rotary polygonal mirror, wherein said imaging optical system includes at least one imaging optical element and wherein at least one optical surface of said at least one imaging optical element has a shape in the sub-scan section which shape comprises a non-arcuate shape including an aspherical coefficient of quartic or higher order, wherein the aspherical coefficient of quartic or higher order changes in the main-scan direction and from a scan central portion of the imaging optical element to a scan end portion of the imaging optical element, wherein, in the non-arcuate shape of the imaging optical element in the sub-scan section and at the scan central portion in the main-scan direction, an absolute value of a curvature radius at an end portion of the imaging optical element in the sub-scan direction is smaller than an absolute value of a curvature radius at a central portion of the imaging optical element in the sub-scan direction, and wherein, in the non-arcuate shape of the imaging optical element in the sub-scan section and at the scan end portion in the main-scan direction, an absolute value of the curvature radius at the end portion of the imaging optical element in the sub-scan direction is larger than the absolute value of the curvature radius at the central portion of the imaging optical element in the sub-scan direction.

In accordance with a yet further aspect of the present invention, there is provided an optical scanning device, comprising: a light source device; a rotary polygonal mirror having a plurality of deflecting surfaces configured to scanningly deflect a light beam emitted from a light emitting member of said light source device; an input optical system configured to direct the light beam emitted from the light emitting member of said light source device to a deflecting surface of said rotary polygonal mirror; and an imaging optical system configured to image the light beam scanningly deflected by the deflection surface of said rotary polygonal mirror, on a scan surface to be scanned; wherein in a sub-scan section the deflecting surface of said rotary polygonal mirror and the scan surface are placed in a conjugate relationship with each other, wherein in a main scan section the light beam incident on the deflecting surface of said rotary polygonal mirror has a beam width wider than a width of the deflecting surface of said rotary polygonal mirror, wherein said imaging optical system includes at least one imaging optical element and wherein at least one optical surface of said at least one imaging optical element has a shape in the sub-scan section which shape comprises a non-arcuate shape including an aspherical coefficient of quartic or higher order, wherein the aspherical coefficient of quartic or higher order changes in dependence upon a coordinate of the imaging optical element in the main-scan direction, wherein the change is such that a wave surface imaged on the scan surface in the sub-scan section when a scan central portion of the scan surface in the main-scan direction is scanned goes ahead at an end portion in the sub-scan direction and with respect to an advancement direction of the wave surface, relative to a reference spherical surface around a paraxial image point in the sub-scan direction, and wherein the change is such that the wave surface imaged on the scan surface in the sub-scan section when a scan end portion of the scan surface in the main-scan direction is scanned is delayed at the end portion in the sub-scan direction and with respect to the advancement direction of the wave surface, relative to the reference spherical surface around the paraxial image point in the sub-scan direction.

In one preferred form in these aspects of the present invention, the light source device includes at least two light emitting members.

The light source device may include a plurality of light source members each having at least one light emitting member, and the optical scanning device may further comprise a beam combining device for directing light beams emitted from said plurality of light source members in the same direction.

In the sub-scan section the light beam incident on the deflecting surface of said rotary polygonal mirror may be incident from an oblique direction relative to a plane perpendicular to a rotational axis of the deflecting surface of said rotary polygonal mirror.

In the sub-scan section the deflecting surface of said rotary polygonal mirror and the scan surface may be placed in a conjugate relationship with each other, throughout the whole scan range.

In accordance with a still further aspect of the present invention, there is provided an image forming apparatus, comprising: an optical scanning device as recited above; a photosensitive member disposed at the scan surface to be scanned; a developing device for developing an electrostatic latent image formed on said photosensitive member with a light beam scanningly deflected by said optical scanning device, to produce a toner image; a transferring device for transferring the developed toner image onto a transfer material; and a fixing device for fixing the transferred toner image, on the transfer material.

In accordance with a yet further aspect of the present invention, there is provided an image forming apparatus, comprising: an optical scanning device as recited above; and a printer controller for converting code data supplied from an outside machine into an imagewise signal and for inputting the imagewise signal into said optical scanning device.

In accordance with a still further aspect of the present invention, there is provided a color image forming apparatus, comprising: a plurality of image bearing members disposed at the scan surface of the optical scanning device as recited above and configured to form images of different colors.

The color image forming apparatus may further comprise a printer controller configured to convert color signals supplied from an external machine to imagewise data of different colors and to input the imagewise data to corresponding optical scanning devices.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

[Under-Field Type Optical Scanning Device]

Figure 1:
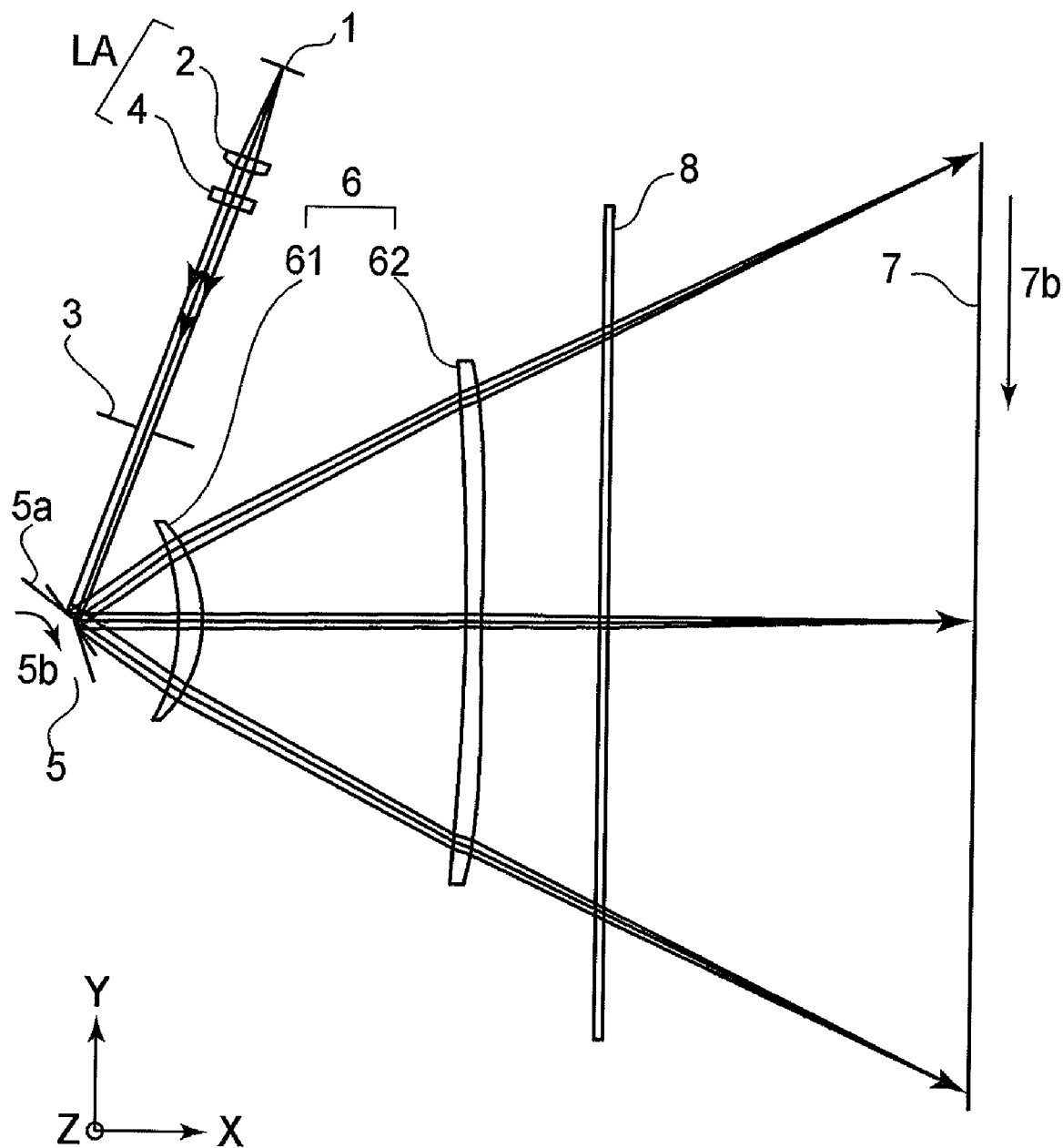
FIG. 1 is a sectional view in the main-scan direction of a main portion of an optical scanning device according to a first embodiment of the present invention.

FIG. 1 is a sectional view (main-scan sectional view) in the main-scan direction of a main portion of an optical scanning device according to a first embodiment of the present invention.

In the following description, the main-scan direction (Y direction) refers to a direction in which a light beam is scanningly deflected by the deflecting means. The sub-scan direction (Z direction) refers to a direction which is parallel to the rotational axis of the deflecting means.

The main-scan section refers to a plane having a normal thereto extending in parallel to the sub-scan direction (Z direction). The sub-scan section refers to a plane having a normal thereto extending in parallel to the main-scan direction (Y direction).

In FIG. 1, the light source means 1 is comprised of a semiconductor laser having a single light emitting member (light emission point).

The light beam emitted from the light source means 1 is converted into parallel light beams by a collimator lens 2 which is a first optical element. Thereafter, the light beam is converged by a cylindrical lens 4 which is a second optical element, only in the sub-scan direction.

Although the first optical element 2 in the present embodiment converts the state of light beam into parallel light beam, the present invention is not limited to this. It may convert the divergent light beam into a divergent light beam having slower divergence or a convergent light beam.

The light beam having been converged only in the sub-scan direction by the cylindrical lens 4 passes through an aperture stop 3 by which the sectional shape thereof is adjusted. Then, the light beam is imaged into a focal line shape elongating in the main-scan direction, in the vicinity of the deflecting surface (deflective reflection surface) 5a of the rotary polygonal mirror 5 which is deflecting means.

The elements of collimator lens 2 and cylindrical lens 4 described above are components of an input optical system LA as the first optical system.

Here, the optical axis of the input optical system LA is disposed to have a predetermined angle (e.g., 2.5 deg.) which is not zero, in the sub-scan direction, relative to a plane perpendicular to the rotational axis of the deflecting surface 5a of the rotary polygonal mirror 5. The input optical system functions to direct the light beam emitted from the light source means 1 to the deflecting surface 5a of the rotary polygonal mirror 5.

In other words, within the sub-scan section, the light beam incident on the deflecting surface 5a of the rotary polygonal mirror 5 is being incident from an oblique direction relative to a plane perpendicular to the rotational axis of the deflecting surface 5a of the rotary polygonal mirror 5.

The optical scanning device of the present embodiment comprises an under-field type optical scanning device in which, within the main-scan section, the light beam from the input optical system LA is incident on the deflecting surface 5a of the rotary polygonal mirror 5 with a light beam width which is narrower than the width of the deflecting surface 5a.

Furthermore, the light beam scanningly deflected by the deflecting surface 5a of the rotary polygonal mirror 5 which is rotating at a constant angular speed in the direction of an arrow 5b in the drawing, is collected into a spot-like shape on the scan surface (photosensitive drum surface) 7 by means of an imaging optical system 6 (second optical system) having two pieces of lenses 61 and 62.

Then, the scan surface 7 is scanned by the light beam focused into a spot-like shape, in the direction of an arrow 7b in the drawing and at a constant speed.

Hereinafter, the imaging optical system 6 will be referred to as "fθ lens system 6", the lens 61 will be referred to as "first fθ lens", and the lens 62 will be referred to as "second fθ lens".

Denoted at 8 is a dustproof glass which is provided to prevent dust particles or toner particle from entering into the optical scanning device.

It is to be noted that in FIG. 1, with regard to the rotary polytonal mirror 5, only the deflecting surface 5a thereof is illustrated.

Here, within the main-scan section, the fθ lens system 6 functions to image the parallel light beam deflectively reflected by the deflecting surface 5a of the rotary polygonal mirror 5, into a spot shape on the scan surface 7.

Furthermore, within the sub-scan section, the fθ lens system 6 functions to bring the scan surface 7 and the imaging position (focal line position) imaged on the deflecting surface 5a by the cylindrical lens 4, into a conjugate relationship with each other, thereby to provide a so-called tilt correction optical system.

Table 1 and Table 2 below show the characteristics of the imaging optical system in the present embodiment.

Now, the point of intersection of each lens surface with the optical axis is taken as an origin, the optical axis direction is taken as an X axis, an axis orthogonal to the optical axis within the main-scan section is taken as a Y axis, and an axis orthogonal to the optical axis within the sub-scan section is taken as a Z axis. Then, the shape in the main-scan section of the lens surfaces of the first and second fθ lenses 61 and 62, constituting the fθ lens system 6 can be expressed by the following equation:

$$x = \frac{y^2/R}{1+(1-(1+k)(y/R)^2)^{1/2}} + \sum_{i=4}^{16} B_i y^i$$

where R is the curvature radius, k is the eccentricity, and $B_4$ to $B_{16}$ are aspherical coefficients.

If the coefficient is different between the plus side of Y (upper side in the drawing) and the minus side thereof (lower side in the drawing), a subscript u is attached to the coefficient of plus side while a subscript 1 is attached to the coefficient of minus side.

The shape of both of the lens surfaces of the first fθ lens 61 and the surface of the second fθ lens 62 at the rotary polygonal mirror 5 side, in the sub-scan section, is an arcuate shape having a curvature radius r in the sub-scan section.

With regard to the shape in the sub-scan section of the lens surface of the second fθ lens 62 at the scan surface 7 side, it is aspherical surface shape (non-arcuate shape) including a quartic term, and it can be expressed as follows.

$$x = \frac{z^2/r'}{1+(1-(1+k_z)(z/r')^2)^{1/2}} + \sum_{j=0}^{10} E_j y^j z^4 + \sum_{k=0}^{10} F_k y^k z^6 + \sum_{l=0}^{10} G_l y^l z^8 + \ldots$$

where $k_z$ is the eccentricity.

Here, the curvature radius r' in the sub-scan section changes continuously with the Y-coordinate of the lens surface, and it is expressed as follows.

$$\frac{1}{r'} = \frac{1}{r} + \sum_{j=2}^{10} D_j y^j$$

where r is the curvature radius on the optical axis in the sub-scan section, and $D_2$ to $D_{10}$ are coefficients of variation of the curvature radius in the sub-scan section.

If the coefficient is different between the plus side of Y (upper side in FIG. 2) and the minus side thereof (lower side in FIG. 2), a subscript u is attached to the coefficient of plus side while a subscript 1 is attached to the coefficient of minus side.

Furthermore, the quartic aspherical coefficient $E_j y_j$ of the sub-scan section changes continuously with the Y-coordinate of the lens surface, and the shape can be presented by the tenth function of Y.

Here, in Table 2, "E-x" means "$10^{-x}$".

It should be noted that, although in this embodiment the aspherical coefficient $F_k y^k$ and $G_l y^l$ of sixth or higher order is zeroth order, they may have a finite value.

TABLE 1

| Used Reference Wavelength | λ | nm | 790 |
|---|---|---|---|
| No. of Light Emission Points | n | | 1 |
| Semiconductor Laser Cover Glass Thickness | dcg | mm | 0.25000 |
| Semiconductor Laser Cover Glass Refractive Index | n0 | | 1.51052 |
| Light Emission Point to Collimator Lens 1st Surface | d0 | mm | 23.35000 |
| Collimator Lens 1st Surface Curvature Radius | R1 | mm | infinite |
| Collimator Lens Thickness | d1 | mm | 3.00000 |
| Collimator Lens Refractive Index | n1 | | 1.76167 |
| Collimator Lens 2nd Surface Curvature Radius | R2 | mm | −19.04573 |
| Collimator Lens 1st Surface to Cylindrical Lens 1st Surface | d2 | mm | 6.36756 |
| Sub-Scan Direction Curvature Radius of Cylindrical Lens 1st Surface | Rs3 | mm | 57.44000 |
| Main-Scan Direction Curvature Radius of Cylindrical Lens 1st Surface | Rm3 | mm | infinite |
| Cylindrical Lens Thickness | d3 | mm | 3.00000 |
| Cylindrical Lens Refractive Index | n3 | | 1.52397 |
| Cylindrical Lens 2nd Surface Curvature Radius | R4 | mm | infinite |
| Cylindrial Lens 2nd Surface to Aperture Stop | d4 | mm | 58.37199 |
| Aperturer Stop to Polygon Deflecting Reflection Surface | d5 | mm | 50.04736 |
| Polygon Deflecting Reflection Surface to 1st f-theta Lens 1st Surface | d6 | mm | 26.00000 |
| 1st f-theta Lens Thickness | d7 | mm | 6.00000 |
| 1st f-theta Lens Refractive Index | n7 | | 1.52397 |

TABLE 1-continued

| | | | |
|---|---|---|---|
| 1st f-theta Lens 2nd Surface to 2nd f-theta Lens 1st Surface | d8 | mm | 63.00000 |
| 2nd f-theta Lens Thickness | d9 | mm | 4.00000 |
| 2nd f-theta Lens Refractive Index | n9 | | 1.52397 |
| 2nd f-theta Lens 2nd Surface to Scan Surface | d10 | mm | 121.05695 |
| Dust-Proof Glass Thickness | t | mm | 2.00000 |
| Dust-Proof Glass Refractive Index | n10 | | 1.51052 |
| Input Optical System Polygon Incidence Angle | γ | deg | 70.00000 |
| Largest Effective Light Ray Scan Angle | η | deg | 35.04795 |
| Polygon Circumscribed Circle Radius | r | mm | 20.00000 |
| No. of Polygon Surfaces | men | | 6 |
| Stop Diameter | φM × φS (ellpitical) | mm | 4.3 × 1.16 |

TABLE 2 f-theta Lens Shape

| 1st Surface | | 2nd Surface | |
|---|---|---|---|
| 1st f-theta Lens | | | |
| R | −47.79289 | R | −32.09907 |
| k | −9.38333E+00 | k | −3.33606E−01 |
| B4 | −1.15068E−05 | B4u | −3.74078E−07 |
| B6 | 3.22676E−08 | B6u | 5.46865E−09 |
| B8 | −4.48458E−11 | B8u | 1.22723E−11 |
| B10 | 1.06619E−14 | B10u | −2.96445E−14 |
| | | B4l | −4.14872E−07 |
| | | B6l | 5.81255E−09 |
| | | B8l | 1.12110E−11 |
| | | B10l | −2.85520E−14 |
| r | 1000.00000 | r | 1000.00000 |
| 2nd f-theta Lens | | | |
| R | −765.98920 | R | 1076.42309 |
| k | 0.00000E+00 | k | 1.68784E+02 |
| B4 | 0.00000E+00 | B4 | −4.25177E−07 |
| B6 | 0.00000E+00 | B6 | 3.04655E−11 |
| B8 | 0.00000E+00 | B8 | −1.40942E−15 |
| B10 | 0.00000E+00 | B10 | 4.12580E−20 |
| r | 198.08300 | r | −32.21895 |
| | | kz | 0.00000E+00 |
| | | D2u | 3.49149E−06 |
| | | D4u | −1.13089E−09 |
| | | D6u | 2.61250E−13 |
| | | D8u | −2.55242E−17 |
| | | D10u | 0.00000E+00 |
| | | S2l | 3.14508E−06 |
| | | D4l | −6.72921E−10 |
| | | D6l | 7.79794E−14 |
| | | D8l | −2.68999E−19 |
| | | D10l | 0.00000E+00 |
| | | E0 | 4.04813E−05 |
| | | E1 | 1.88164E−08 |
| | | E2 | −3.80934E−08 |
| | | E3 | −2.16279E−10 |
| | | E4 | 6.61635E−12 |
| | | E5 | 3.05708E−13 |
| | | E6 | −1.98246E−16 |
| | | E7 | −1.22612E−16 |
| | | E8 | −2.13308E−20 |
| | | E9 | 1.65626E−20 |
| | | E10 | 2.28763E−23 |

Figure 2:
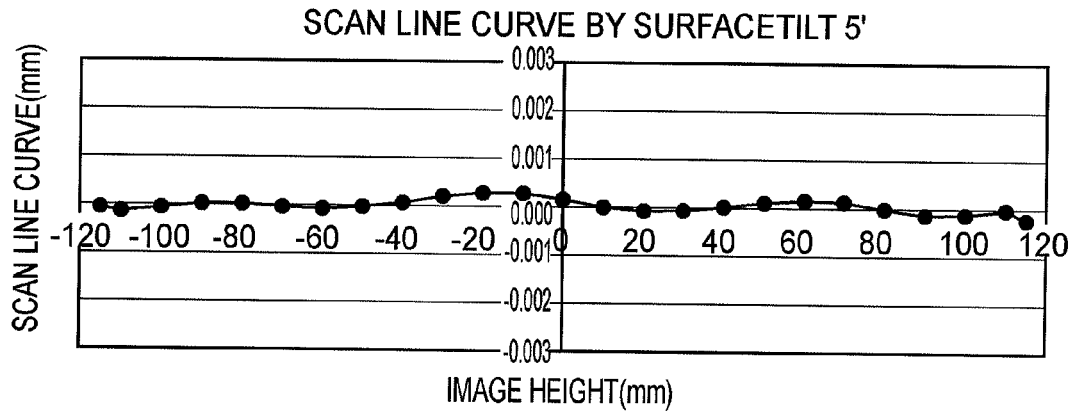
FIG. 2 is a graph illustrating the scan line curve due to the surface tilt, in the first embodiment of the present invention.

FIG. 2 illustrates the scan line curve in the present embodiment caused by a surface tilt in a case where the deflecting surface 5a has a tilt error 5' which is upward in the sub-scan direction due to a finishing error.

Figure 3:
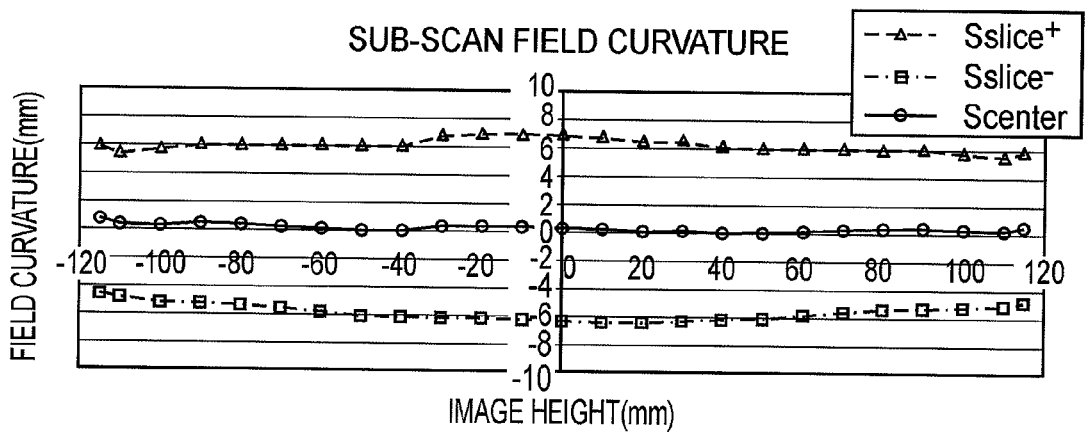
FIG. 3 is a graph illustrating field curvature in the sub-scan direction, in the first embodiment of the present invention.

FIG. 3 illustrates the field curvature in the sub-scan direction in the present embodiment.

In FIG. 3, "Sslice+" denotes the plus side defocusing position where the spot diameter in the sub-scan direction becomes 85 μm or less. Similarly, "Sslice−" denotes the minus side defocusing position where the spot diameter in the sub-scan direction becomes 85 μm or less.

Furthermore, "Scenter" denotes the intermediate defocusing position between "Sslice+" and "Sslice−".

In accordance with the present embodiment, the amount of scan line curve due to the surface tilt when a tilt error of 5' of the deflecting surface 5 which is upward in the sub-scan direction is caused by a finishing error, can be kept at 0.3 μm or less throughout the effective scan region (±115 mm). Thus, good performance is realized.

Furthermore, the field curvature in the sub-scan direction is P-P (Peak to Peak) 0.7 mm, and thus good optical performance is satisfied as well.

Here, for explanation of advantageous effects of the present embodiment, a comparative example 1 and a comparative example 2 of the present invention will be described.

COMPARATIVE EXAMPLE 1

Table 3 and Table 4 below show the characteristics of the imaging optical system in comparative example 1.

TABLE 3

| | | | |
|---|---|---|---|
| Used Reference Wavelength | λ | nm | 790 |
| No. of Light Emission Points | n | | 1 |
| Semiconductor Laser Cover Glass Thickness | dcg | mm | 0.25000 |
| Semiconductor Laser Cover Glass Refractive Index | n0 | | 1.51052 |
| Light Emission Point to Collimator Lens 1st Surface | d0 | mm | 23.35000 |
| Collimator Lens 1st Surface Curvature Radius | R1 | mm | infinite |
| Collimator Lens Thickness | d1 | mm | 3.00000 |
| Collimator Lens Refractive Index | n1 | | 1.76167 |
| Collimator Lens 2nd Surface Curvature Radius | R2 | mm | −19.04573 |
| Collimator Lens 1st Surface to Cylindrical Lens 1st Surface | d2 | mm | 6.36756 |
| Sub-Scan Direction Curvature Radius of Cylindrical Lens 1st Surface | Rs3 | mm | 57.44000 |
| Main-Scan Direction Curvature Radius of Cylindrical Lens 1st Surface | Rm3 | mm | infinite |
| Cylindrical Lens Thickness | d3 | mm | 3.00000 |
| Cylindrical Lens Refractive Index | n3 | | 1.52397 |
| Cylindrical Lens 2nd Surface Curvature Radius | R4 | mm | infinite |
| Cylindrial Lens 2nd Surface to Aperture Stop | d4 | mm | 58.37199 |
| Apertuer Stop to Polygon Deflecting Reflection Surface | d5 | mm | 50.04736 |
| Polygon Deflecting Reflection Surface to 1st f-theta Lens 1st Surface | d6 | mm | 26.00000 |
| 1st f-theta Lens Thickness | d7 | mm | 6.00000 |
| 1st f-theta Lens Refractive Index | n7 | | 1.52397 |
| 1st f-theta Lens 2nd Surface to 2nd f-theta Lens 1st Surface | d8 | mm | 63.00000 |
| 2nd f-theta Lens Thickness | d9 | mm | 4.00000 |
| 2nd f-theta Lens Refractive Index | n9 | | 1.52397 |
| 2nd f-theta Lens 2nd Surface to Scan Surface | d10 | mm | 121.05831 |
| Dust-Proof Glass Thickness | t | mm | 2.00000 |
| Dust-Proof Glass Refractive Index | n10 | | 1.51052 |
| Input Optical System Polygon Incidence Angle | γ | deg | 70.00000 |
| Largest Effective Light Ray Scan Angle | η | deg | 35.04795 |
| Polygon Circumscribed Circle Radius | r | mm | 20.00000 |
| No. of Polygon Surfaces | men | | 6 |
| Stop Diameter | φM × φS (ellpitical) | mm | 4.3 × 1.16 |

TABLE 4 f-theta Lens Shape

| | 1st Surface | | 2nd Surface |
|---|---|---|---|
| | | 1st f-theta Lens | |
| R | −47.79289 | R | −32.09907 |
| k | −9.38333E+00 | k | −3.33606E−01 |
| B4 | −1.15068E−05 | B4u | −3.74078E−07 |
| B6 | 3.22676E−08 | B6u | 5.46865E−09 |
| B8 | −4.48458E−11 | B8u | 1.22723E−11 |
| B10 | 1.06619E−14 | B10u | −2.96445E−14 |
| | | B4l | −4.14872E−07 |
| | | B6l | 5.81255E−09 |
| | | B8l | 1.12110E−11 |
| | | B10l | −2.85520E−14 |
| r | 1000.00000 | r | 1000.00000 |
| | | 2nd f-theta Lens | |
| R | −765.98920 | R | 1076.42309 |
| k | 0.00000E+00 | k | 1.68784E+02 |
| B4 | 0.00000E+00 | B4 | −4.25177E−07 |
| B6 | 0.00000E+00 | B6 | 3.04655E−11 |
| B8 | 0.00000E+00 | B8 | −1.40942E−15 |
| B10 | 0.00000E+00 | B10 | 4.12580E−20 |
| r | 198.08300 | r | −32.32636 |
| | | D2u | 3.39053E+00 |
| | | D4u | −1.10429E−09 |
| | | D6u | 2.57075E−13 |
| | | D8u | −2.53632E−17 |
| | | D10u | 0.00000E+00 |
| | | S2l | 3.08278E−06 |
| | | D4l | −7.04852E−10 |
| | | D6l | 9.66209E−14 |
| | | D8l | −3.31569E−18 |
| | | D10l | 0.00000E+00 |

The comparative example 1 differs from the first embodiment of the present invention in that the shape in the sub-scan section of the lens surface of the second fθ lens 62 at the scan surface 7 side is a simple arcuate shape.

Here, the curvature radius r' in the sub-scan section changes continuously with the Y-coordinate of the lens surface, and it is expressed as follows, like the first embodiment.

$$\frac{1}{r'} = \frac{1}{r} + \sum_{j=2}^{10} D_j y^j$$

where r is the curvature radius on the optical axis in the sub-scan section, and $D_2$ to $D_{10}$ are coefficients of variation of the curvature radius in the sub-scan section.

If the coefficient is different between the plus side of Y (upper side in FIG. 2) and the minus side thereof (lower side in FIG. 2), a subscript u is attached to the coefficient of plus side while a subscript l is attached to the coefficient of minus side.

In the comparative example 1, the values of D2 to $D_{10}$ are different from those of the first embodiment.

Figure 4:
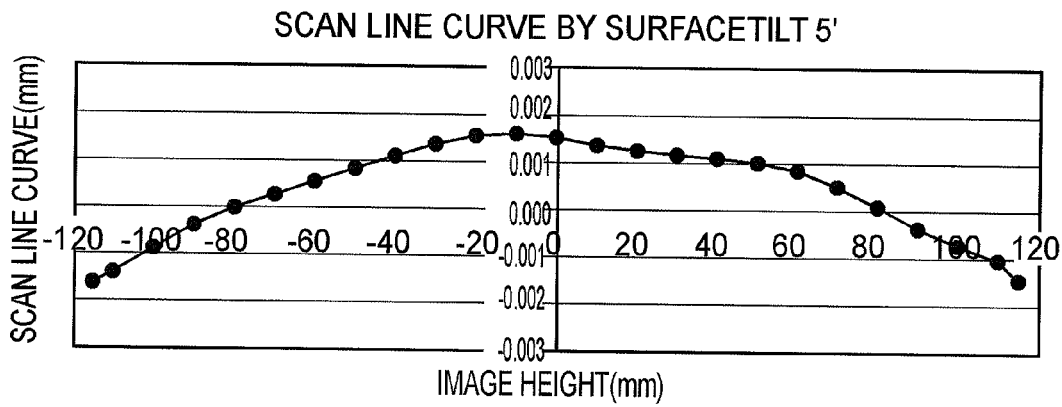
FIG. 4 is a graph illustrating the scan line curve due to the surface tilt, in comparative example 1.

FIG. 4 illustrates the scan line curve in the comparative example 1 caused by a surface tilt in a case where the deflecting surface 5a has a tilt error 5' which is upward in the sub-scan direction due to a finishing error.

Figure 5:
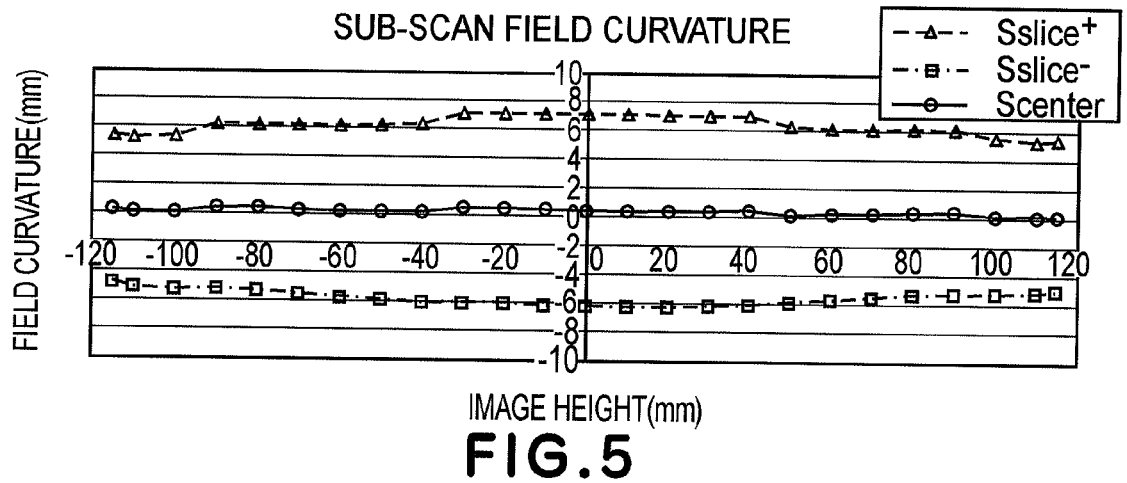
FIG. 5 is a graph illustrating the field curvature in the sub-scan direction, in comparative example 1.

FIG. 5 illustrates the field curvature in the sub-scan direction in the comparative example 1.

In FIG. 5, "Sslice+" denotes the plus side defocusing position where the spot diameter in the sub-scan direction becomes 85 μm or less. Similarly, "Sslice−" denotes the minus side defocusing position where the spot diameter in the sub-scan direction becomes 85 μm or less.

Furthermore, "Scenter" denotes the intermediate defocusing position between "Sslice+" and "Sslice−".

The comparative example 1 is an example of an optical system of conventional optical scanning devices, and the focal line and the scan surface are designed to be conjugate with each other. Therefore, the field curvature in the sub-scan direction well corrected as shown in FIG. 5.

However, the amount of scan line curve due to the surface tilt if the deflecting surface 5a has a tilt error of 5' upward in the sub-scan direction resulting from a finishing error, is as large as P-P 3.2 μm throughout the whole effective scan region (±115 mm), as shown in FIG. 4.

Figure 27:
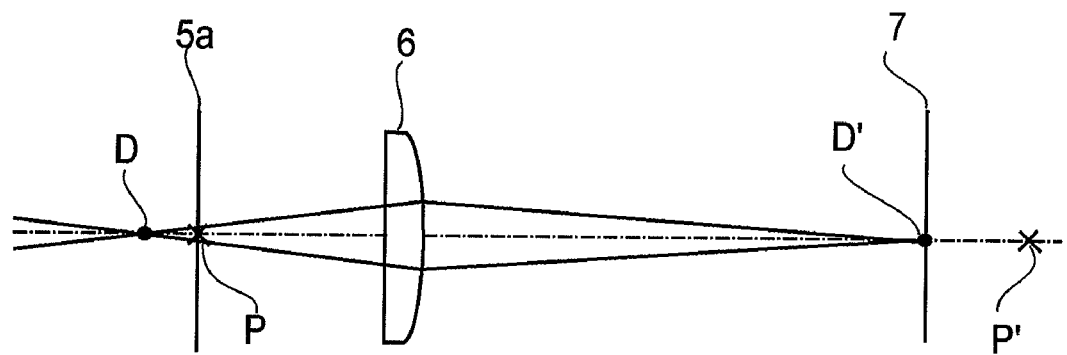
FIG. 27 is a diagram showing the imaging relationship when the deflecting surface of FIG. 26 is in the state A.
Figure 28:
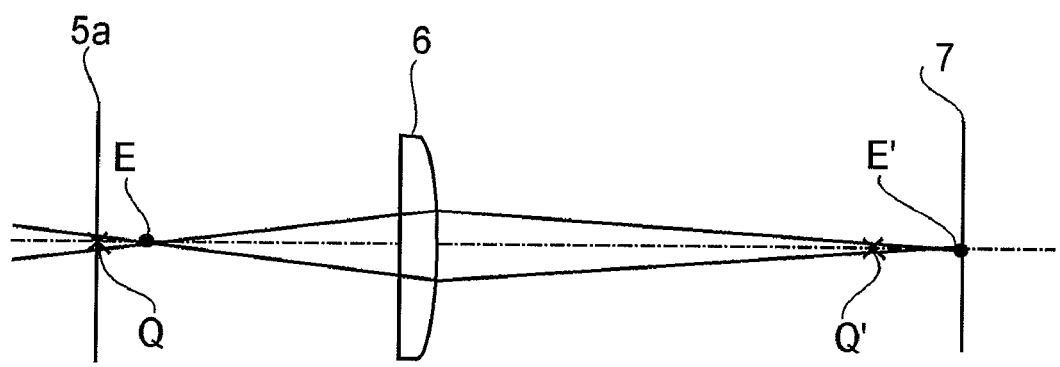
FIG. 28 is a diagram showing the imaging relationship when the deflecting surface of FIG. 26 is in the state B.
Figure 29:
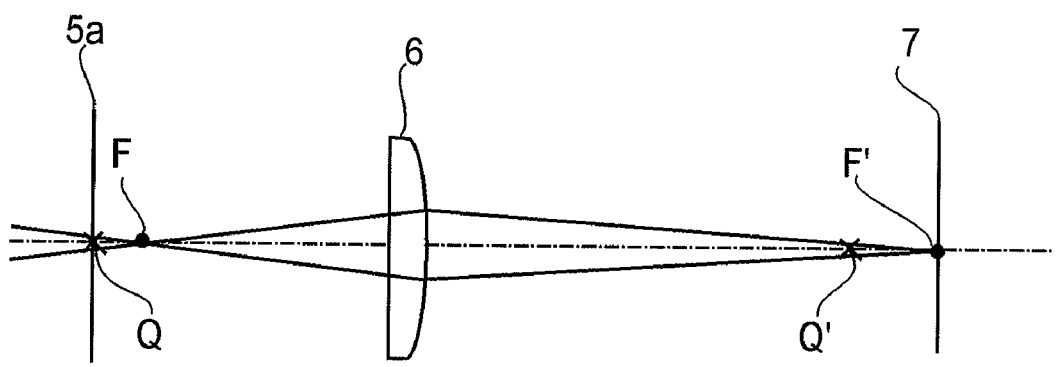
FIG. 29 is a diagram showing the imaging relationship when the deflecting surface of FIG. 26 is in the state C.
Figure 30:
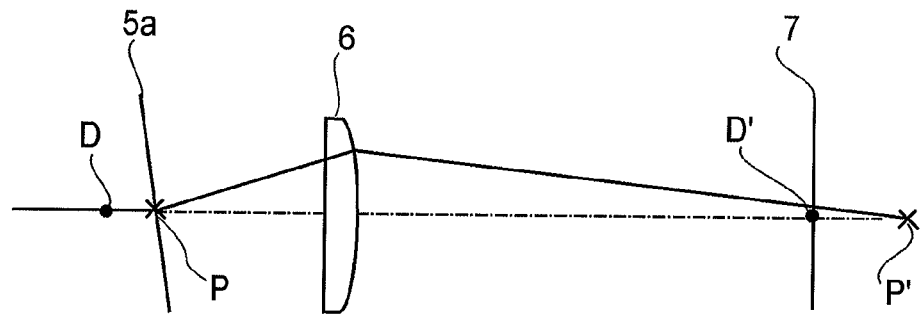
FIG. 30 is a diagram showing the state when a tilt error occurred in the deflecting surface of FIG. 27.
Figure 31:
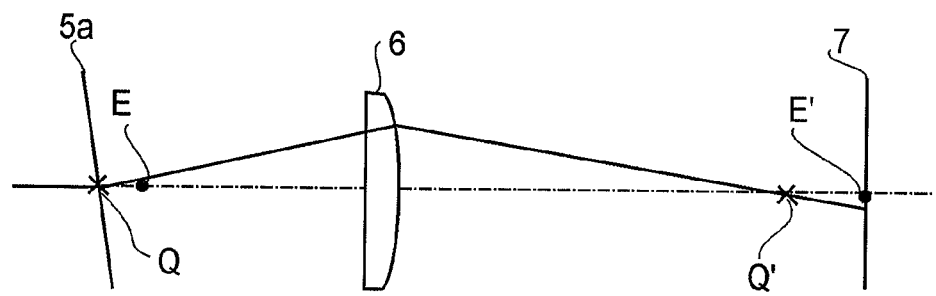
FIG. 31 is a diagram showing the state when a tilt error occurred in the deflecting surface of FIG. 28.
Figure 32:
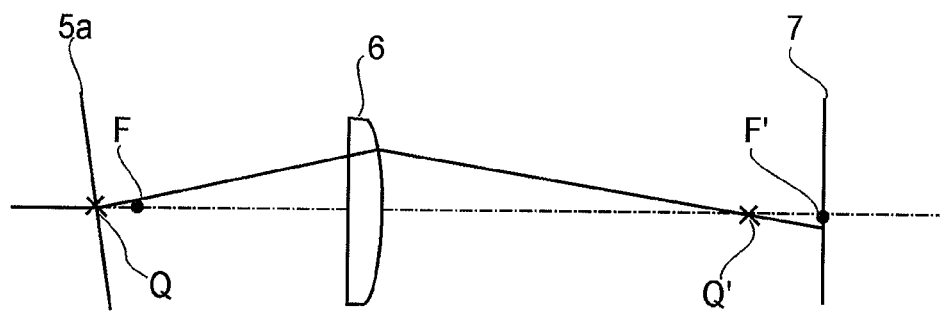
FIG. 32 is a diagram showing the state when a tilt error occurred in the deflecting surface of FIG. 29.
Figure 33:
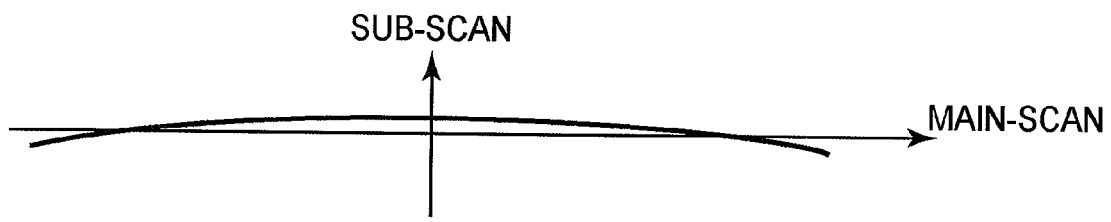
FIG. 33 is a diagram showing the scan line curve due to the surface tilt.

It would be readily understood that the amount of scan line curve due to the surface tilt can be reduced by, in FIGS. 27 through 29, placing the points P and Q on the deflecting surface 5a and the scan surface 7 in a conjugate relationship in the sub-scan section with respect to the fθ lens system 6.

In such case, however, in FIG. 27 the conjugate point D' of the focal line D comes to the left-hand side of the scan surface 7 as viewed in the drawing and, in FIG. 28 and FIG. 29 the conjugate points E' and F' of the focal lines E and F come to the right-hand side of the scan surface 7 as viewed in the drawing.

Consequently, the image plane in the sub-scan direction will be curved to the minus side at the scan central portion and curved to the plus side at the scan end portion.

Comparative example 2 is an example of an optical system of an optical scanning device designed as such.

COMPARATIVE EXAMPLE 2

Table 5 and Table 6 below show the characteristics of the imaging optical system in the present embodiment.

TABLE 5

| | | | |
|---|---|---|---|
| Used Reference Wavelength | λ | nm | 790 |
| No. of Light Emission Points | n | | 1 |
| Semiconductor Laser Cover Glass Thickness | dcg | mm | 0.25000 |
| Semiconductor Laser Cover Glass Refractive Index | n0 | | 1.51052 |
| Light Emission Point to Collimator Lens 1st Surface | d0 | mm | 23.35000 |
| Collimator Lens 1st Surface Curvature Radius | R1 | mm | infinite |
| Collimator Lens Thickness | d1 | mm | 3.00000 |
| Collimator Lens Refractive Index | n1 | | 1.76167 |
| Collimator Lens 2nd Surface Curvature Radius | R2 | mm | −19.04573 |
| Collimator Lens 1st Surface to Cylindrical Lens 1st Surface | d2 | mm | 6.36756 |
| Sub-Scan Direction Curvature Radius of Cylindrical Lens 1st Surface | Rs3 | mm | 57.44000 |
| Main-Scan Direction Curvature Radius of Cylindrical Lens 1st Surface | Rm3 | mm | infinite |
| Cylindrical Lens Thickness | d3 | mm | 3.00000 |
| Cylindrical Lens Refractive Index | n3 | | 1.52397 |
| Cylindrical Lens 2nd Surface Curvature Radius | R4 | mm | infinite |
| Cylindrial Lens 2nd Surface to Aperture Stop | d4 | mm | 58.37199 |
| Apertuer Stop to Polygon Deflecting Reflection Surface | d5 | mm | 50.04736 |
| Polygon Deflecting Reflection Surface to 1st f-theta Lens 1st Surface | d6 | mm | 26.00000 |
| 1st f-theta Lens Thickness | d7 | mm | 6.00000 |
| 1st f-theta Lens Refractive Index | n7 | | 1.52397 |
| 1st f-theta Lens 2nd Surface to 2nd f-theta Lens 1st Surface | d8 | mm | 63.00000 |
| 2nd f-theta Lens Thickness | d9 | mm | 4.00000 |

TABLE 5-continued

| | | | |
|---|---|---|---|
| 2nd f-theta Lens Refractive Index | n9 | | 1.52397 |
| 2nd f-theta Lens 2nd Surface to Scan Surface | d10 | mm | 121.05695 |
| Dust-Proof Glass Thickness | t | mm | 2.00000 |
| Dust-Proof Glass Refractive Index | n10 | | 1.51052 |
| Input Optical System Polygon Incidence Angle | γ | deg | 70.00000 |
| Largest Effective Light Ray Scan Angle | η | deg | 35.04795 |
| Polygon Circumscribed Circle Radius | r | mm | 20.00000 |
| No. of Polygon Surfaces | men | | 6 |
| Stop Diameter | φM × φS (ellpitical) | mm | 4.3 × 1.16 |

TABLE 6 f-theta Lens Shape

| 1st Surface | | 2nd Surface | |
|---|---|---|---|
| 1st f-theta Lens | | | |
| R | −47.79289 | R | −32.09907 |
| k | −9.38333E+00 | k | −3.33606E−01 |
| B4 | −1.15068E−05 | B4u | −3.74078E−07 |
| B6 | 3.22676E−08 | B6u | 5.46865E−09 |
| B8 | −4.48458E−11 | B8u | 1.22723E−11 |
| B10 | 1.06619E−14 | B10u | −2.96445E−14 |
| | | B4l | −4.14872E−07 |
| | | B6l | 5.81255E−09 |
| | | B8l | 1.12110E−11 |
| | | B10l | −2.85520E−14 |
| r | 1000.00000 | r | 1000.00000 |
| 2nd f-theta Lens | | | |
| R | −765.98920 | R | 1076.42309 |
| k | 0.00000E+00 | k | 1.68784E+02 |
| B4 | 0.00000E+00 | B4 | −4.25177E−07 |
| B6 | 0.00000E+00 | B6 | 3.04655E−11 |
| B8 | 0.00000E+00 | B8 | −1.40942E−15 |
| B10 | 0.00000E+00 | B10 | 4.12580E−20 |
| r | 198.08300 | r | −32.21895 |
| | | D2u | 3.49149E−06 |
| | | D4u | −1.13089E−09 |
| | | D6u | 2.61250E−13 |
| | | D8u | −2.55242E−17 |
| | | D10u | 0.00000E+00 |
| | | S2l | 3.14508E−06 |
| | | D4l | −6.72921E−10 |
| | | D6l | 7.79794E−14 |
| | | D8l | −2.68999E−19 |
| | | D10l | 0.00000E+00 |

The comparative example 2 differs from the comparative example 1 described hereinbefore in that the curvature radius r on the optical axis in the sub-scan section as well as the variation coefficients $D_2$-$D_{10}$ of the curvature radius in the sub-scan section in the equation $$\frac{1}{r'} = \frac{1}{r} + \sum_{j=2}^{10} D_j y^j$$

that represents the shape in the sub-scan section of the lens surface of the second fθ lens 62 at the scan surface 7 side, are changed to assure that the point on the deflecting surface and the scan surface 7 are conjugate with each other in the sub-scan section with respect to the fθ lens 6 throughout the whole effective scan region (whole scan range).

Here, if the coefficient is different between the plus side of Y (upper side in FIG. 2) and the minus side thereof (lower side in FIG. 2), a subscript u is attached to the coefficient of plus side while a subscript l is attached to the coefficient of minus side.

Figure 6:
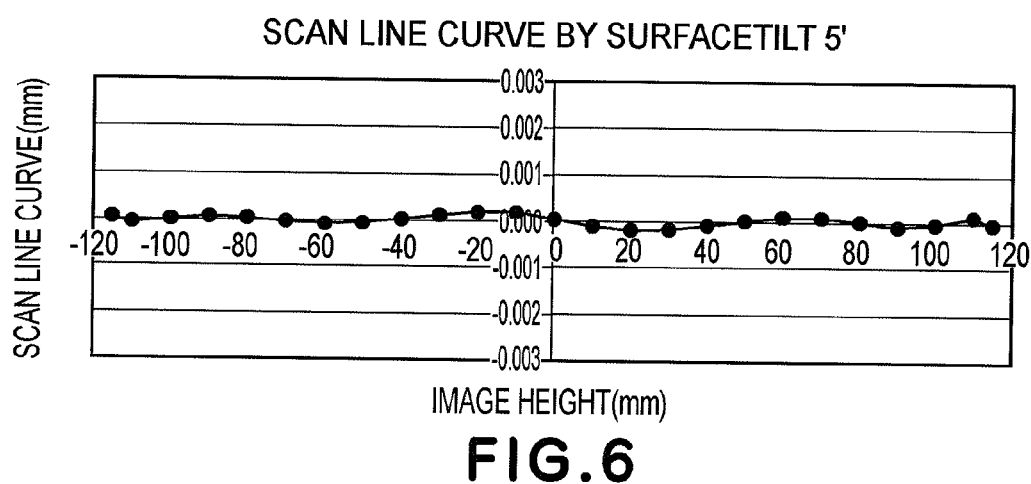
FIG. 6 is a graph illustrating the scan line curve due to the surface tilt, in comparative example 2.

FIG. 6 illustrates the scan line curve in the comparative example 2 caused by a surface tilt in a case where the deflecting surface 5a has a tilt error 5' which is upward in the sub-scan direction due to a finishing error.

The comparative example 2 is arranged so that the point on the deflecting surface and the scan surface 7 are conjugate with each other in the sub-scan section with respect to the fθ lens 6, throughout the whole effective scan region.

Therefore, the amount of scan line curve due to the surface tilt when a tilt error of 5' of the deflecting surface 5 which is upward in the sub-scan direction is caused by a finishing error, can be kept at 0.3 μm or less throughout the effective scan region (±115 mm). Thus, good performance is realized.

Figure 7:
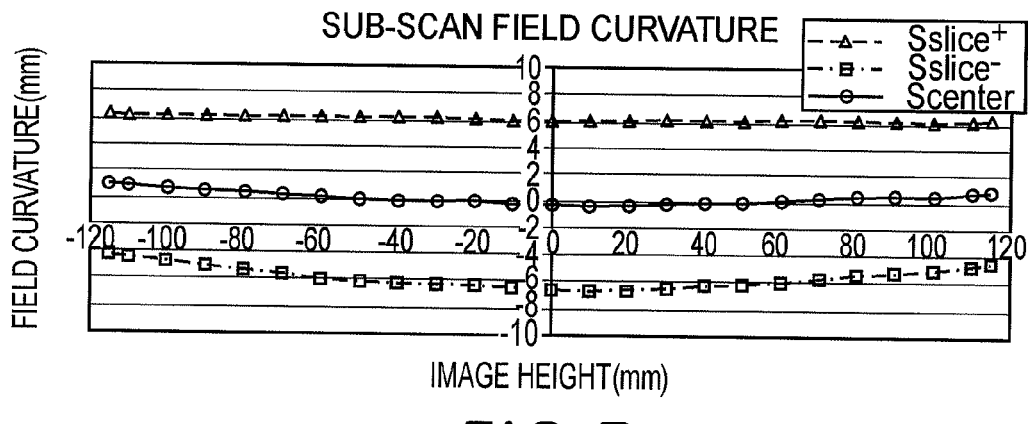
FIG. 7 is a graph illustrating the field curvature in the sub-scan direction, in comparative example 2.

FIG. 7 illustrates the field curvature in the sub-scan direction in the comparative example 2.

In FIG. 7, "Sslice+" denotes the plus side defocusing position where the spot diameter in the sub-scan direction becomes 85 μm or less. Similarly, "Sslice−" denotes the minus side defocusing position where the spot diameter in the sub-scan direction becomes 85 μm or less.

Furthermore, "Scenter" denotes the intermediate defocusing position between "Sslice+" and "Sslice−".

It is seen that, in order to reduce the amount of scan line curve due to the surface tilt, the image plane in the sub-scan direction is curved toward minus side at the scan central portion while it is curved toward plus side at the scan end portion.

As described above, if the scan line curve by the tilt of deflecting surface 5a is going to be corrected, the image plane in the sub-scan direction would be necessarily curved as a consequence of it, as in the comparative example 2.

In accordance with the present embodiment, as shown in FIG. 2 and FIG. 3, the amount of scan line curve due to the surface tilt when a tilt error of 5' of the deflecting surface 5 which is upward in the sub-scan direction is caused by a finishing error, can be kept at 0.3 μm or less throughout the effective scan region (±115 mm). Thus, good performance is realized.

Additionally, in the present embodiment, the field curvature in the sub-scan direction is as good as P-P 0.7 mm. Thus, superior performance is accomplished simultaneously.

The method therefore will be explained below.

The present embodiment has a feature that the shape in the sub-scan section of the lens surface of the second fθ lens 62 at the scan surface 7 side is an aspherical surface shape (non-arcuate shape) including a quartic term presented by the following equation.

$$x = \frac{z^2/r'}{1+(1-(1+k_z)(z/r')^2)^{1/2}} + \sum_{j=0}^{10} E_j y^j z^4 + \sum_{k=0}^{10} F_k y^k z^6 + \sum_{l=0}^{10} G_l y^l z^8 + \ldots$$

It is seen that from this equation that the quartic aspherical coefficient $E_j y^j$ within the sub-scan section changes continuously with the Y-coordinate of the lens surface as the optical surface, and the shape can be expressed by the tenth function of Y.

In the present embodiment, the curvature radius r on the optical axis in the sub-scan section as well as the variation coefficients $D_2$-$D_{10}$ of the curvature radius in the sub-scan section are the same as those of the comparative example 2.

Namely, the point on the deflecting surface and the scan surface 7 are made conjugate with each other in the sub-scan section with respect to the fθ lens system 6, throughout the whole effective scan region.

On the other hand, if such arrangement is used, as in the comparative example 2, the image plane in the sub-scan direction will be curved toward the minus side in the scan central portion and curved toward the plus side at the scan end portion.

In consideration of this, in the present embodiment, the shape of the wave surface in the sub-scan section at the scan central portion is made as follows.

Namely, the image plane is so shaped that the wave surface which emerges from the lens surface of the second fθ lens 62 at the scan surface side and is imaged on the scan surface according to the quartic aspherical term in the sub-scan section is delayed with respect to the advancement direction of the wave surface and relative to the reference spherical surface around a paraxial image point in the sub-scan direction, at the end portion in the sub-scan direction.

With this arrangement, the position where the wavefront aberration in the sub-scan section is minimized can be made closer to the scan surface 7.

Thus, the image plane in the sub-scan direction can be made nearer to the scan surface 7 while keeping the conjugate relationship of the deflecting surface 5a and the scan surface 7.

Furthermore, the shape of the wave surface in the sub-scan section at the scan end portion is made as follows.

Namely, the image plane is so shaped that the wave surface which emerges from the lens surface of the second fθ lens 62 at the scan surface side and is imaged on the scan surface according to the quartic aspherical term in the sub-scan section goes ahead with respect to the advancement direction of the wave surface and relative to the reference spherical surface around a paraxial image point in the sub-scan direction, at the end portion in the sub-scan direction.

With this arrangement, the position where the wavefront aberration in the sub-scan section is minimized can be made closer to the scan surface 7.

Thus, the image plane in the sub-scan direction can be made closer to the scan surface 7 while keeping the conjugate relationship of the deflecting surface 5a and the scan surface 7.

In the present embodiment, with regard to the shape of the lens surface of the second fθ lens 62 at the scan surface 7 side, a quartic aspherical term is introduced and the aspherical coefficient is changed depending on the Y-coordinate of the lens surface as the optical surface.

Here, the change is such that the wave surface which emerges from the fθ lens system 6 and is imaged on the scan surface as the light beam scans the scan central portion is delayed relative to the reference spherical surface around a paraxial image point in the sub-scan direction, at the end portion in the sub-scan direction.

Furthermore, the change is such that the wave surface which emerges from the fθ lens system 6 and is imaged on the scan surface as the light beam scans the scan end portion goes ahead relative to the reference spherical surface around a paraxial image point in the sub-scan direction, at the end portion in the sub-scan direction.

With this arrangement, the amount of scan line curve due to the surface tilt when a tilt error of 5' of the deflecting surface 5 which is upward in the sub-scan direction is caused by a finishing error, can be kept at 0.3 μm or less throughout the effective scan region (±115 mm). Thus, good performance is realized.

Additionally, the field curvature in the sub-scan direction is as good as P-P 0.7 mm. Thus, superior performance is accomplished simultaneously.

Table 7 shows the quartic aspherical coefficient in the sub-scan section of the lens surface of the second fθ lens 62 at the scan surface 7 side, in the present embodiment.

It is seen that that the quartic aspherical coefficient changes with the Y-coordinate of the lens surface as the optical surface.

TABLE 7

| Image Height | Lens Surface Y Coordinate | Sub-scan Quartic Aspherical Coefficient |
| --- | --- | --- |
| 115 | 55.686079 | −1.93783E−05 |
| 110 | 52.878571 | −1.66503E−05 |
| 100 | 47.365445 | −1.06734E−05 |
| 90 | 42.004498 | −4.62941E−06 |
| 80 | 36.806876 | 1.74040E−06 |
| 70 | 31.772139 | 8.61739E−06 |
| 60 | 26.88971 | 1.57854E−05 |
| 50 | 22.142755 | 2.27664E−05 |
| 40 | 17.510629 | 2.90293E−05 |
| 30 | 12.972051 | 3.41344E−05 |
| 20 | 8.505529 | 3.78002E−05 |
| 10 | 4.089599 | 3.99085E−05 |
| 0 | −0.297175 | 4.04723E−05 |
| −10 | −4.676016 | 3.95850E−05 |
| −20 | −9.06771 | 3.73662E−05 |
| −30 | −13.492659 | 3.39148E−05 |
| −40 | −17.970983 | 2.92770E−05 |
| −50 | −22.522547 | 2.34435E−05 |
| −60 | −27.166571 | 1.63873E−05 |
| −70 | −31.920491 | 8.15145E−06 |
| −80 | −36.798079 | −1.02658E−06 |
| −90 | −41.807262 | −1.06370E−05 |
| −100 | −46.948432 | −2.00972E−05 |
| −110 | −52.214176 | −2.97208E−05 |
| −115 | −54.889767 | −3.55235E−05 |

Figure 8:
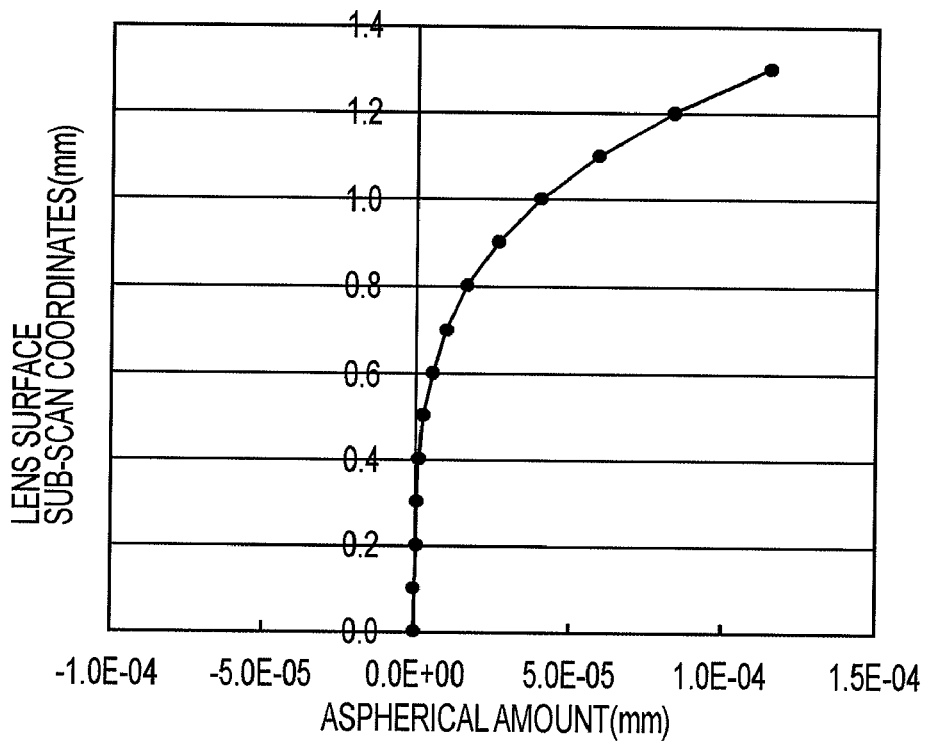
FIG. 8 is a graph illustrating the aspherical quantity surface based on the quartic aspherical coefficient in the first embodiment of the present invention.

FIG. 8 illustrates the aspherical amount according to the quartic aspherical coefficient in the sub-scan section of the lens surface of the second fθ lens 62 at the scan surface 7 side, in the scan central portion (zero image height in Table 7), as an example.

In FIG. 8, the axis of ordinate depicts the lens surface coordinate in the sub-scan section, and point zero corresponds to the position where the principal ray passes through.

Figure 9:
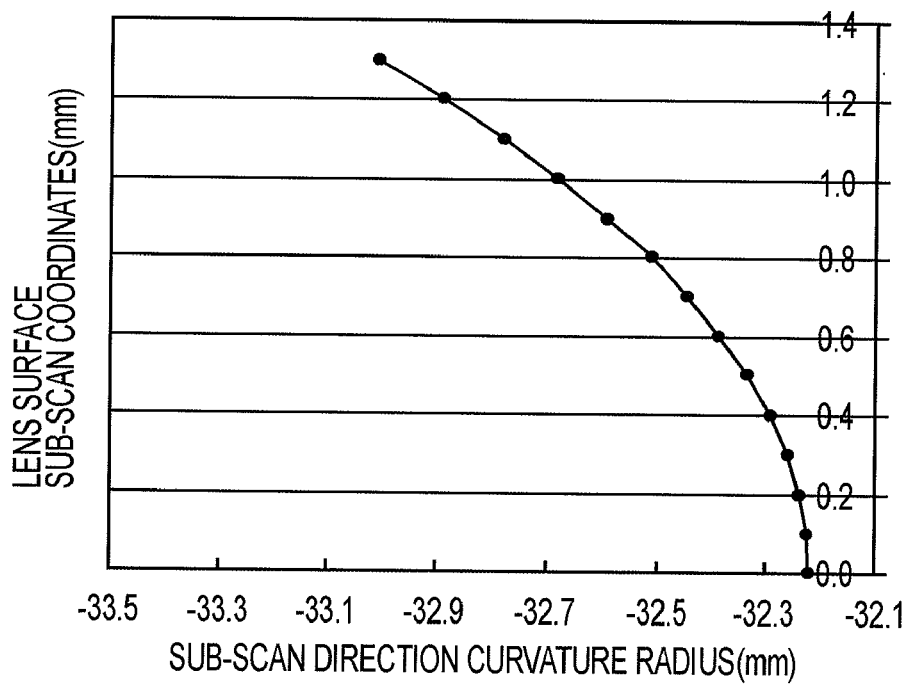
FIG. 9 is a graph illustrating the curvature radius in the sub-scan section, in the first embodiment of the present invention.

Furthermore, FIG. 9 illustrates the curvature radius in the sub-scan section of the lens surface of the second fθ lens 62 at the scan surface 7 side, in the scan central portion (zero image height in Table 7).

In FIG. 9, the axis of ordinate depicts the lens surface coordinate in the sub-scan section as an optic surface, and point zero corresponds to the position where the principal ray passes through.

It is seen from FIG. 9 that, as compared with the absolute value of the curvature radius in the sub-scan section of the central portion of the lens surface in the sub-scan direction, the absolute value of the curvature radius of the peripheral portion in the sub-scan section is large.

By setting the shape in the sub-scan section of the lens surface of the second fθ lens 62 at the scan surface 7 side as described above, the wave surface which emerges from the second fθ lens 62 and is imaged on the scan surface is delayed relative to the reference spherical surface around a paraxial image point in the sub-scan direction, at the end portion in the sub-scan direction.

Figure 10:
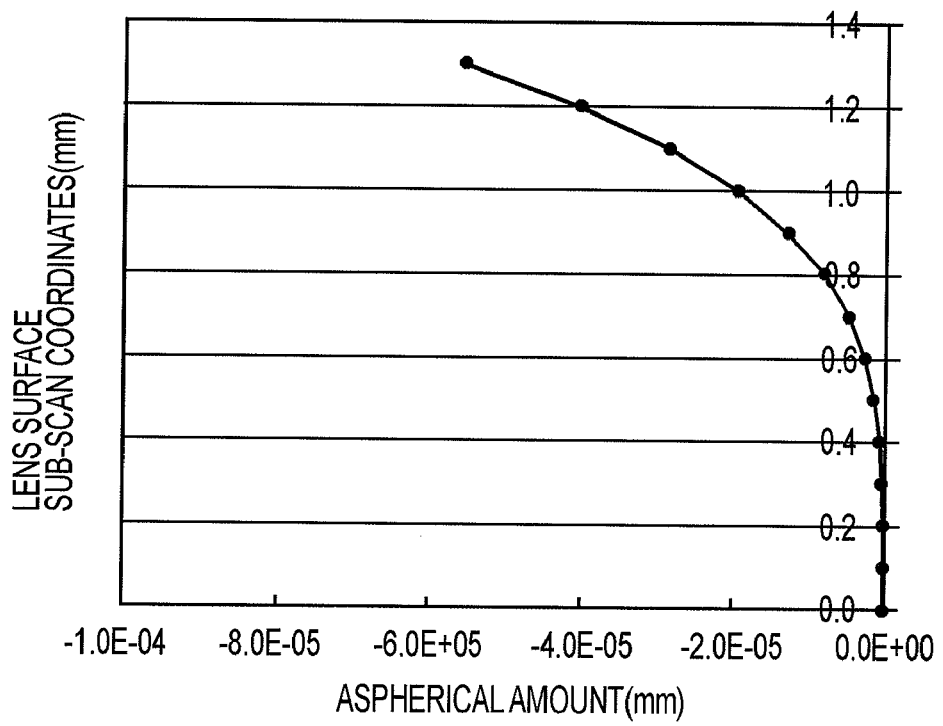
FIG. 10 is a graph illustrating the aspherical quantity surface based on the quartic aspherical coefficient in the first embodiment of the present invention.

Furthermore, FIG. 10 illustrates the aspherical amount according to the quartic aspherical coefficient in the sub-scan section of the lens surface of the second fθ lens 62 at the scan surface 7 side, in the plus-side scan end portion (image height 115 in Table 7), as an example.

In FIG. 10, the axis of ordinate depicts the lens surface coordinate in the sub-scan section, and point zero corresponds to the position where the principal ray passes through.

Figure 11:
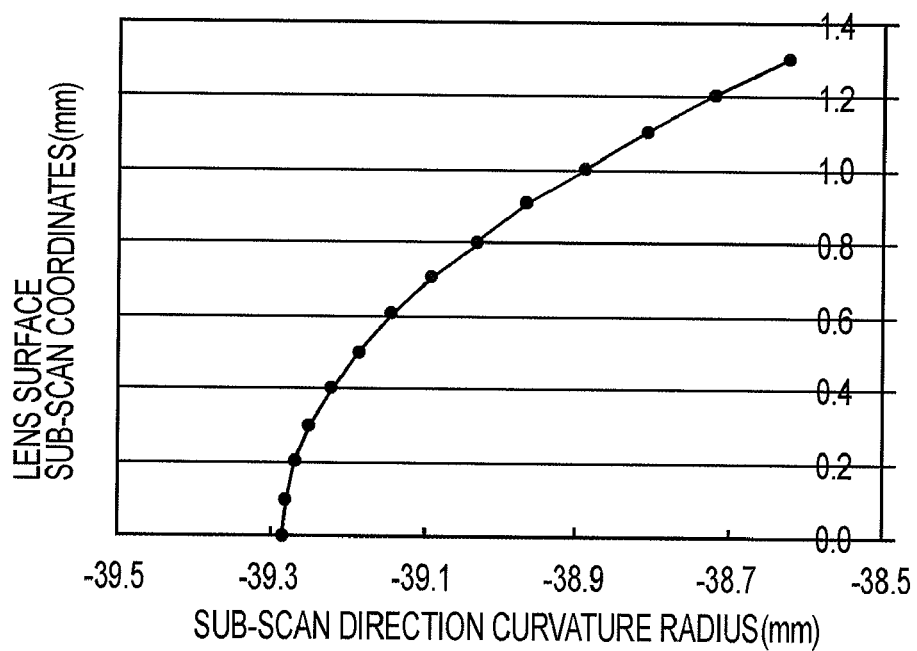
FIG. 11 is a graph illustrating the curvature radius in the sub-scan section, in the first embodiment of the present invention.

Furthermore, FIG. 11 illustrates the curvature radius in the sub-scan section of the lens surface of the second fθ lens 62 at the scan surface 7 side, in the plus-side scan end portion (image height 115 in Table 7).

In FIG. 11, the axis of ordinate depicts the lens surface coordinate in the sub-scan section, and point zero corresponds to the position where the principal ray passes through.

It is seen from FIG. 11 that, as compared with the absolute value of the curvature radius in the sub-scan section of the central portion of the lens surface in the sub-scan direction, the absolute value of the curvature radius of the peripheral portion in the sub-scan section is small.

By setting the shape in the sub-scan section of the lens surface of the second fθ lens 62 at the scan surface 7 side as described above, the wave surface which emerges from the second fθ lens 62 and is imaged on the scan surface goes ahead relative to the reference spherical surface around a paraxial image point in the sub-scan direction, at the end portion in the sub-scan direction.

As described above, in the present embodiment, with regard to the shape of the lens surface of the second fθ lens 62 at the scan surface 7 side in the present embodiment, a quartic aspherical term is introduced and the aspherical coefficient is changed depending on the Y-coordinate of the lens surface as the optical surface.

Here, the change is such that the wave surface which is imaged on the scan surface as the light beam scans the scan central portion on the scan surface is delayed relative to the reference spherical surface around a paraxial image point in the sub-scan direction, at the end portion in the sub-scan direction, while the wave surface which is imaged on the scan surface as the light beam scans the scan end portion on the scan surface goes ahead relative to the reference spherical surface around a paraxial image point in the sub-scan direction, at the end portion in the sub-scan direction.

With this arrangement, the amount of scan line curve due to the surface tilt when a tilt error of 5' of the deflecting surface 5 which is upward in the sub-scan direction is caused by a finishing error, can be kept at 0.3 μm or less throughout the effective scan region (±115 mm). Thus, good performance is realized.

Additionally, the field curvature in the sub-scan direction is as good as P-P 0.7 mm. Thus, superior performance is accomplished simultaneously.

It is to be noted here that although a quartic aspherical term is introduced inside the sub-scan section in this embodiment, if it is an even-number order, a sixth order term may be introduced in addition to the quartic term. Alternatively, only a sixth order term may be introduced, and similar advantageous results will be obtainable even in that occasion.

A further higher order term may be introduced, with similar advantageous results.

The light source means in the present embodiment is comprised of a semiconductor laser having a single light emitting member, and the number of the surfaces of the rotary polygonal mirror 5 is four (4).

If the optical scanning device of the present embodiment is applied to an image forming apparatus of an image resolution 600 DPI, the period of pitch unevenness due to the scan line curve resulting from the surface tilt is $$25.4/600*4=0.1693 \text{ (mm)}$$

Since in that case the pitch is finer than the pitch of 0.25-5 mm which is most conspicuous from the visible sensitivity characteristic of the visual system of human being, it is somewhat advantageous in terms of eyesight. Additionally, the amount of scan line curve due to the surface tilt is optically reduced to 0.3 μm or less.

Therefore, higher precision image output is enabled.

It should be noted that, although in the present embodiment the imaging optical system 6 is comprised of two pieces of imaging optical elements, the invention is not limited to this. It may be comprised of one or more imaging optical elements.

Embodiment 2

A second embodiment of the present invention will be explained below.

This embodiment differs from the abovementioned first embodiment in that, as the light source means 1, a monolithic multi-beam semiconductor laser comprising four light emitting members is used.

The structure and optical function of the remaining portion are similar to the first embodiment, and hence similar advantageous results are obtained.

More specifically, in the present embodiment, the optical system just uses that of the first embodiment and, for higher speed, a monolithic multi-beam semiconductor laser having four light emitting members is used as the light source means 1.

The number of the surfaces of the rotary polygonal mirror 5 is four (4), like the first embodiment described hereinbefore.

Hence, if the optical scanning device of the present embodiment is applied to an image forming apparatus of an image resolution 600 DPI, the period of pitch unevenness due to the scan line curve resulting from the surface tilt is $$25.4/600*4*4=0.6773 \text{ (mm)}$$

The pitch unevenness which is rough such as above is visually very conspicuous.

If the amount of scan line curve by the surface tilt is as large as P-P 3.2 μm as in the comparative example 1 described hereinbefore, it will be the prime factor for deteriorating the image quality.

In the present embodiment, even if plural (4) light emitting members are used as the light source means to achieve higher speed, the amount of scan line curve by the surface tilt can be held down to a very small amount of 0.3 μm or less.

As a result, in this embodiment, high precision image output is accomplished.

It is to be noted that, although the present embodiment shows an example using a monolithic multi-beam semiconductor laser which is comprised of a plurality of light emitting members (four light emitting members, specifically), the present invention is not limited to this.

For example, a plurality of single-beam semiconductor lasers (light source members) each being comprised of a single light emitting member may be used, and one or more light beams emitted from the plurality of light source members may be combined by known-type beam synthesizing means and directed to the same direction. Similar advantageous results are obtainable in that occasion.

Furthermore, a plurality of monolithic multi-beam semiconductor lasers (light source members) each comprising a plurality of light emitting members may be used, and the light beams may be combined by known-type beam synthesizing means and directed to the same direction. Similar advantageous results are obtainable in that occasion.

Embodiment 3

Figure 12:
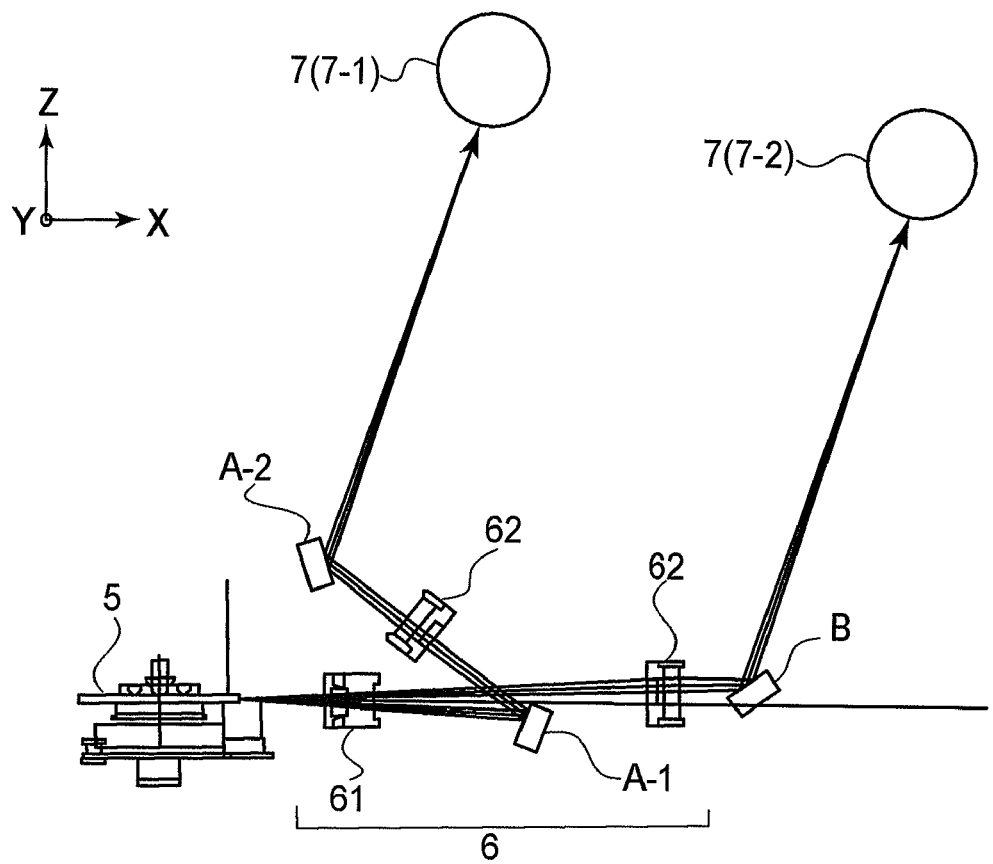
FIG. 12 is a sectional view in the sub-scan direction of a main portion of an optical scanning device according to a third embodiment of the present invention.

FIG. 12 is a sectional view (sub-scan sectional view) in the sub-scan direction of a main portion of an optical scanning device according to a third embodiment of the present invention.

The present embodiment differs from the first embodiment described hereinbefore in that the optical scanning device of the present invention is applied to a color image forming apparatus.

The structure and optical function of the remaining portion are similar to the first embodiment, and hence similar advantageous results are obtained.

It should be noted that the optical arrangement being expanded in the main-scan direction is the same as FIG. 1 of the abovementioned first embodiment.

More specifically, the present embodiment has such structure that, in order to apply an optical system of the optical scanning device of the first embodiment to a color image forming apparatus, a plurality of light beams are incident on a single rotary polygonal mirror 5 to simultaneously optically scan a plurality of scan surfaces (photosensitive drum surfaces) 7-1 and 7-2.

In the present embodiment, the optical components use those of the first embodiment, and the input optical system is so disposed to provide an angle of 2.5 deg. (a finite angle not equal to zero) from the above and below in the sub-scan direction.

With regard to the fθ lens system 6, the first fθ lens 61 is disposed with the same attitude as of the first embodiment, and the light beams scanningly deflected at upward and downward angles of 2.5 deg., respectively, from the rotary polygonal mirror 5 are incident at upper and lower positions on the same first fθ lens 61.

The light beam emerging from the first fθ lens 61 toward the scan surface 7-1 is reflected by a reflecting mirror A-1 and then it is incident on the second fθ lens 62. Thereafter, the light beam is reflected by a reflecting mirror A-2, and it scans the scan surface 7-1.

On the other hand, the light beam emerging from the first fθ lens 61 toward the scan surface 7-2 is directly incident on another second fθ lens 62 having the same shape and provided separately. The light beam is then reflected by a reflecting mirror B, and it scans the scan surface 7-2.

In the present embodiment, a color image forming apparatus is constituted by disposing two optical scanning devices shown in FIG. 12 side by side.

If a rotary polygonal mirror is used in relation to each individual color (C, M, Y and B colors), the overall system would be upsized. For this reason, color image forming apparatuses frequently use the structure like the present embodiment that a light beam is incident on a rotary polygonal mirror 5 obliquely from the sub-scan direction at a predetermined angle and reflected thereby.

Hereinafter, such a structure will be referred to as a "sub-scan oblique incidence optical system".

In such sub-scan oblique incidence optical system, besides the pitch unevenness due to the scan line curve caused by the surface tilt of the deflecting surface 5a of the rotary polygonal mirror 5as described hereinbefore, there is a problem of pitch unevenness due to the decentration of the deflecting surface 5a which is peculiar to the sub-scan oblique incidence optical system, as well.

The pitch unevenness due to the decentration of deflecting surface 5a will be explained below.

Figure 13:
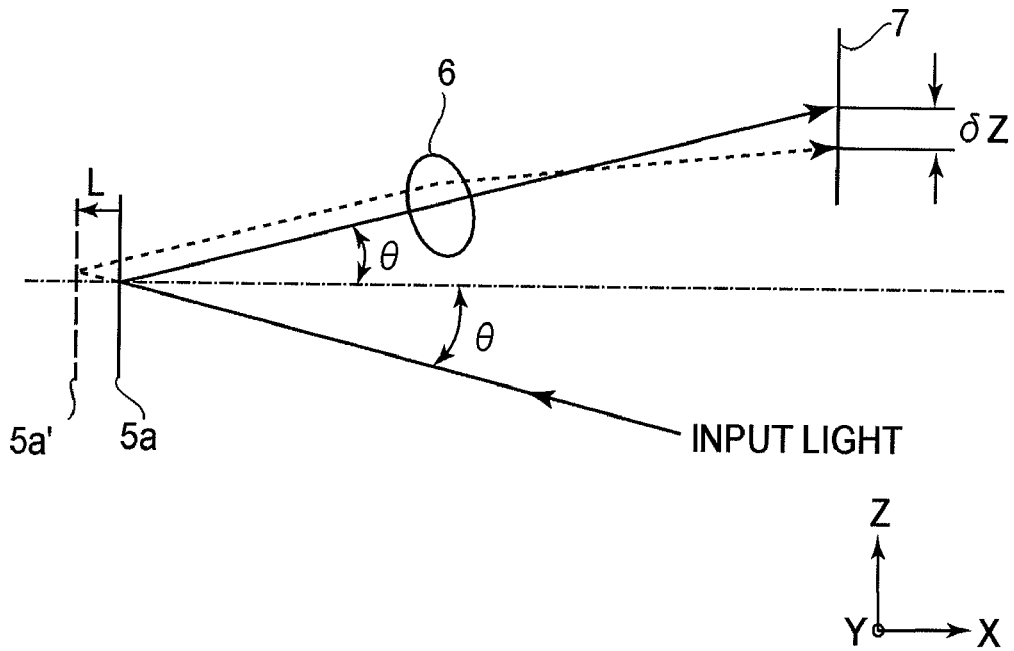
FIG. 13 is a schematic diagram in the sub-scan section of a sub-scan oblique incidence optical system.

FIG. 13 is a schematic diagram of the sub-scan oblique incidence optical system in the sub-scan section.

In FIG. 13, the light beam from the input optical system LA is incident on the deflecting surface 5a while defining an angle θ in the sub-scan direction with respect to the main-scan plane, obliquely from the below as viewed in the drawing. Subsequently, the light beam reflected by the deflecting surface 5a is reflected obliquely upwardly as viewed in the drawing at an angle θ, and it is incident on the fθ lens system 6. Then, the light beam arrives (is imaged on) the scan surface 7.

FIG. 13 illustrates the principal ray of the light beam at that time by a solid line.

On the other hand, a case where the deflecting surface 5a is decentered by a distance L to the broken-line position 5' will be considered.

The light beam reflected by the decentered deflecting surface 5a' passes along the light path depicted by a dotted line in the drawing, and it reaches the scan surface 7. Here, the position of impingement of the light beam is shifted downwardly in the sub-scan direction by a distance δZ.

The deviation amount δZ is determined fixedly based on the oblique incidence angle θ in the sub-scan direction, the decentration amount L of the deflecting surface 5a and the lateral magnification β of the fθ lens system 6 in the sub-scan section, and it is presented by:

$$\delta Z = 2L\beta \tan \theta$$

The decentration amount L of the deflecting surface 5a increases by the accumulation of:

(I) Dispersion of the distance from the center of rotation of the rotary polygonal mirror 5 to each deflecting surface, caused in the machining;

(II) An error in diameter of the bore formed at the rotational center of the rotary polygonal mirror 5 to receive a motor shaft; and (iii) An error in diameter of the motor shaft on which the rotary polygonal mirror 5 is mounted.

Hence, usually, there is a decentration amount of around 20 μm to 30 μm.

For example, if calculation is made with reference to FIG. 13 under the condition that θ=3 deg., L=20 μm and the lateral magnification β of the fθ lens system 6 in the sub-scan section is θ=1.5×, the deviation amount δZ will be as follows.

$$\delta Z = 2 * 20 \,\mu m * 1.5 * \tan 3° = 3.14 \,\mu m$$

Hence, in FIG. 13, on the scan surface 7 the scan line shifts downwardly in the scan direction by 3.14 μm.

It is to be noted that, if the decentration of the deflecting surface 5a is in a direction opposite to that of FIG. 13, the scan line will be deviated upwardly in the sub-scan direction by the same amount.

Generally, the deflecting surfaces 5a of the rotary polygonal mirror have different decentration amounts, and the decentration is not uniform in the same direction.

This means that the scan surface is scanned periodically by scan lines which are deviated downwardly and upwardly in the sub-scan direction, and this leads to pitch unevenness of image.

As described above, in the optical scanning device which meets a color image forming apparatus and uses a sub-scan oblique incidence optical system as of the present embodiment, the pitch unevenness due to decentration of the deflecting surface 5a of the rotary polygonal mirror 5 is added.

Therefore, as compared with an optical scanning device for scanning in the main-scan plane like the first embodiment described hereinbefore, the pitch unevenness occurs quite easily.

Hence, in the sub-scan oblique incidence optical system as of the present embodiment, reduction of pitch unevenness resulting from the scan line curve by the surface tilt is crucial.

In the present embodiment, the oblique incidence angle 0 in the sub-scan direction is 2.5 deg. and the lateral magnification β of the fθ lens system 6 in the sub-scan section is 1.265×.

The decentration amount L of the deflecting surface 5a is assumed to be around 20 mum, taking into consideration of a case where no special precision machining is performed.

The deviation amount δZ on the scan surface 7 in the sub-scan direction is as follows.

$$\delta Z = 2*20 \mu m*1.265* \tan 2.5° = 2.21 \mu m$$

Thus, there will occur a pitch unevenness of 2.21 μm.

The pitch unevenness due to the scan line curve by the surface tilt in the present embodiment is the 0.3 μm as the same as the first embodiment and, when the pitch unevenness of 2.21 μm due to the decentration of the deflecting surface 5a is taken into account, this means that a pitch unevenness of 2.51 μm will be produced at the maximum.

Here, if an optical scanning device such as the comparative example 1 mentioned hereinbefore is used as the optical scanning device of the present embodiment, a pitch irregularity as much as 3.2 μm will be produced only by the scan line curve due to the surface tilt.

Furthermore, a pitch unevenness of 2.21 μm by the decentration of the deflecting surface 5a will be added. Consequently, there will be a pitch unevenness of 5.41 μm at the maximum.

The pitch unevenness more than 5 μm would degrade the image quality considerably, and particularly it would not at all allowable for high-precision color images.

In the present embodiment, in consideration of this, in a sub-scan oblique incidence optical system, a quartic aspherical term is introduced in regard to the shape of the lens surface of the second fθ lens 62 at the scan surface 7 side, and the aspherical coefficient thereof is changed depending on the Y-coordinate of the lens surface.

Here, the change is such that the wave surface which emerges from the fθ lens system 6 and is imaged on the scan surface is delayed relative to the reference spherical surface around a paraxial image point in the sub-scan direction, at the end portion in the sub-scan direction.

Furthermore, the change is such that the wave surface which emerges from the fθ lens system 6 and is imaged on the scan surface as the light beam scans the scan end portion goes ahead relative to the reference spherical surface around a paraxial image point in the sub-scan direction, at the end portion in the sub-scan direction.

With this arrangement, the amount of scan line curve due to the surface tilt when a tilt error of 5' of the deflecting surface 5 which is upward in the sub-scan direction is caused by a finishing error, can be kept at 0.3 μm or less throughout the effective scan region (±115 mm). Thus, good performance is realized.

Additionally, the field curvature in the sub-scan direction is as good as P-P 0.7 mm. Thus, superior performance is accomplished simultaneously.

As a result of this, even if the pitch unevenness of 2.21 μm due to decentration of the deflecting surface 5a peculiar to the sub-scan oblique incidence optical system is taken into consideration, the pitch unevenness can be controlled as small as 2.51 μm at the maximum.

[Over-Field Type Optical Scanning Device]

The foregoing description has been made with reference to an example of what is called "under-field type optical scanning device" in which the width in the main-scan direction of the light beam incident on the deflecting surface 5a is narrower than the width of the deflecting surface 5a in the main-scan direction.

Recently, what is called an "over-field type optical scanning device" in which the width in the main-scan direction of the light beam incident on the deflecting surface 5a is wider than the width of the deflecting surface 5a in the main-scan direction and in which the size of the rotary polygonal mirror does not become large if has a large number of deflecting surfaces, which is very convenient for the speedup, has been used widely.

Figure 14:
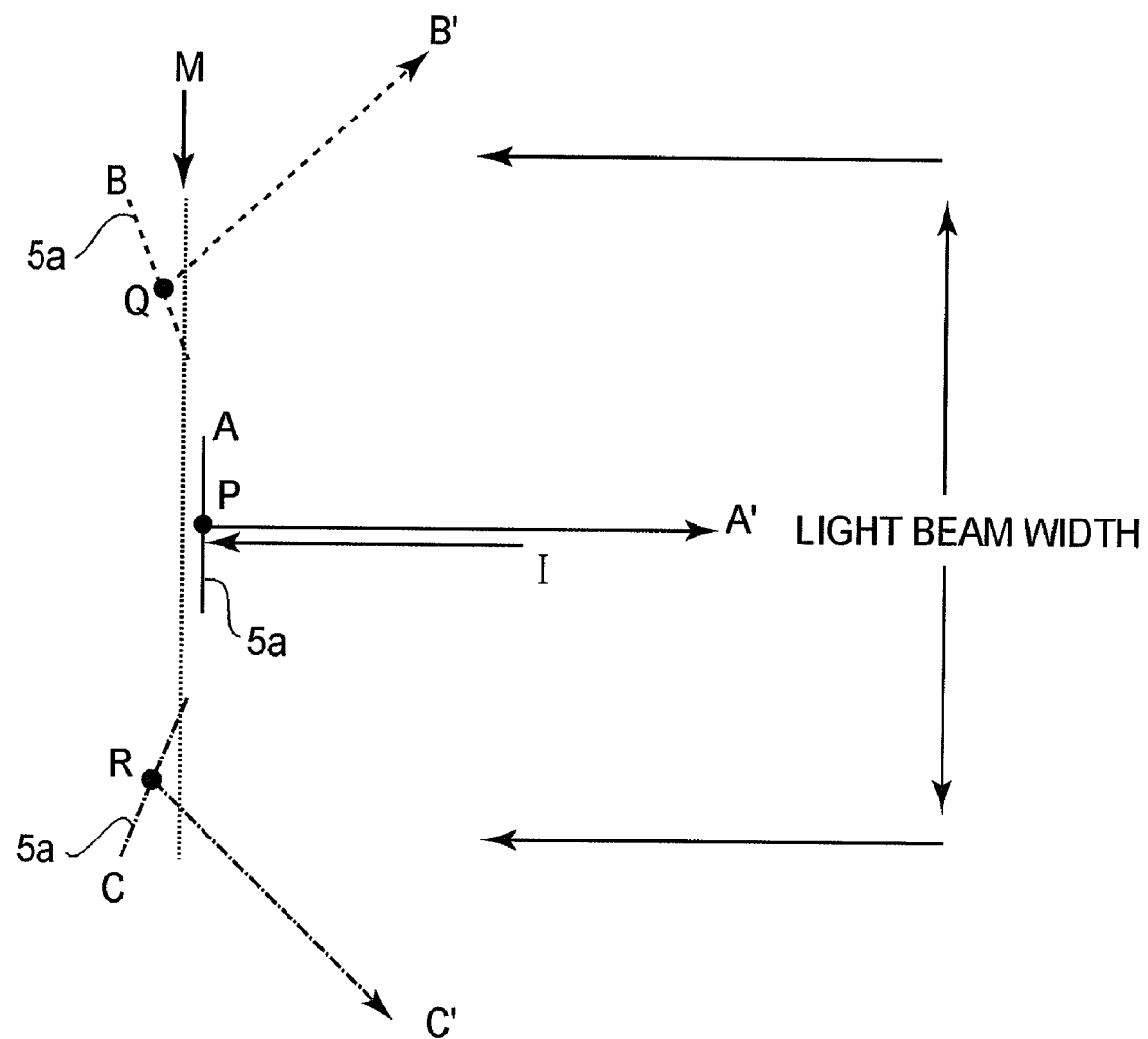
FIG. 14 is an enlarged view of a portion of an over-field type optical scanning device around the deflecting surface.

FIG. 14 is an enlarged view of a portion around the deflecting surface of an over-field type optical scanning device in which the width in the main-scan direction of the light beam incident on the deflecting surface 5a is wider than the width of the deflecting surface 5a in the main-scan direction.

Denoted in the drawing at I is the principal ray of the light beam from light source means which is incident on the rotary polygonal mirror.

Depicted at A, B and C are the states of deflection of the deflecting surface 5a of the rotary polygonal mirror 5.

Specifically, the state A illustrates the rotary polygonal mirror 5 as a light beam scanningly deflected by the deflecting surface 5a scans a central portion of the scan surface 7.

The light beam I incident on the deflecting surface 5a has a width larger than the width of the deflecting surface 5a, and thus the light beam portion incident on the deflecting surface 5a in the state A is reflected at the intersection point P with the deflecting surface 5a, rightwardly in the direction toward A' as viewed in the drawing. Then, it is incident on the fθ lens system 6 which is at the right-hand side as viewed in the drawing.

The state B illustrates the rotary polygonal mirror 5 as a light beam scanningly deflected by the deflecting surface 5a scans an upper end portion of the scan surface 7.

The light beam I incident on the deflecting surface 5a has a width larger than the width of the deflecting surface 5a, and thus the light beam portion incident on the deflecting surface 5a in the state B is reflected at the intersection point Q with the deflecting surface 5a to the upper right in the direction toward B' as viewed in the drawing. Then, it is incident on the fθ lens system 6.

The state C illustrates the rotary polygonal mirror 5 as a light beam scanningly deflected by the deflecting surface 5a scans a lower end portion of the scan surface 7.

The light beam I incident on the deflecting surface 5a has a width larger than the width of the deflecting surface 5a, and thus the light beam portion incident on the deflecting surface 5a in the state C is reflected at the intersection point R with the deflecting surface 5a to the lower right in the direction toward C' as viewed in the drawing. Then, it is incident on the fθ lens system 6.

Here, the refracting power in the sub-scan direction of the cylindrical lens 4 as well as the position thereof are so set that the imaging position (imaging position in the sub-scan direction) of the focal line (line image) imaged by the cylindrical lens 4 (not shown) is placed approximately at the middle between the point P and the point Q in the drawing.

Furthermore, the focal line imaged by the cylindrical lens 4 and the scan surface 7 are kept in a conjugate relationship with each other by the fθ lens system 6 in the sub-scan section.

Figure 15:
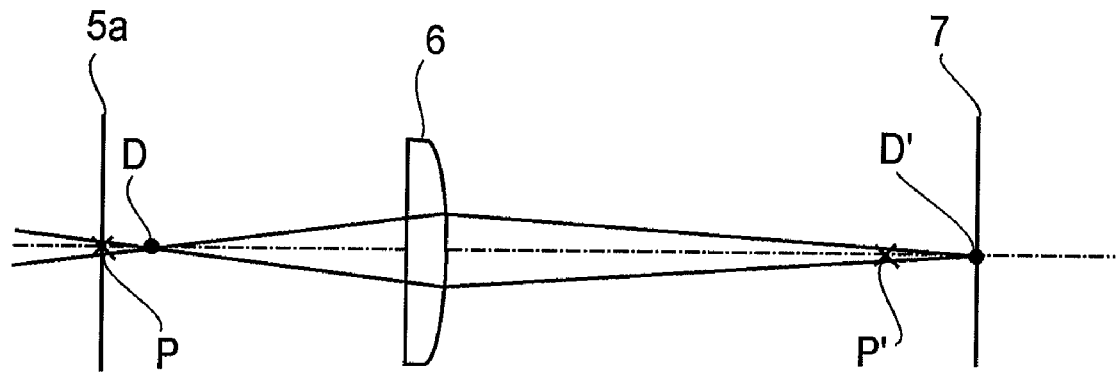
FIG. 15 is a diagram showing the imaging relationship when the deflecting surface of FIG. 14 is in the state A.

FIG. 15 illustrates the imaging relationship in the sub-scan section when the deflecting surface 5a of FIG. 14 is in the state A, that is, when the light beam being scanningly deflected is scanning the central portion of the scan surface 7.

As has been described with reference to FIG. 14, the imaging position (imaging position in the sub-scan direction) of the focal line imaged by the cylindrical lens 4 is placed approximately at the middle position between the point P and points Q and R.

Thus, in FIG. 15, the focal line D (position D of the focal line) of the light beam incident on the deflecting surface 5a from the left in the drawing is located after (right-hand side in the drawing) the deflecting surface 5a. The point P is the position where the light beam incident on the deflecting surface 5a is reflected.

Here, since the focal line D and the scan surface 7 are made conjugate with each other in the sub-scan section by the fθ lens system 6, the conjugate point in the sub-scan section of the focal line D coincides with the scan surface 7. In FIG. 15, it is illustrated as D'.

On the other hand, the conjugate point of the point P on the deflecting surface 5a is located in the leftward direction P' of the scan surface 7 in the drawing.

Figure 16:
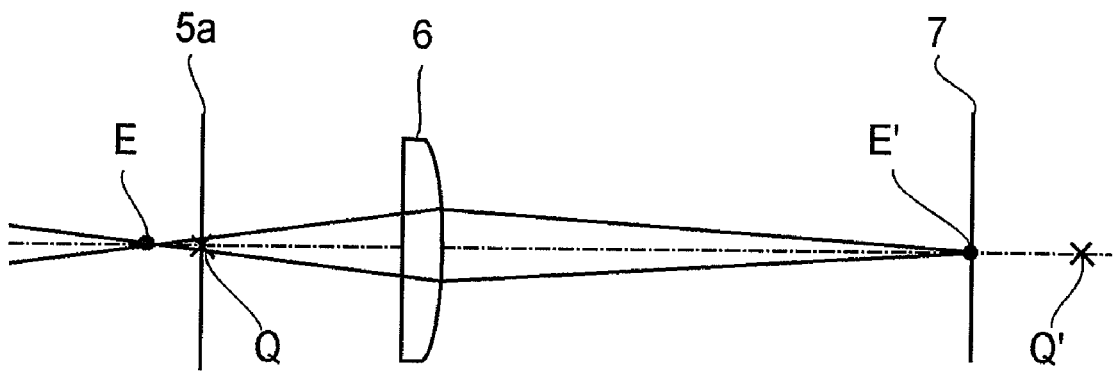
FIG. 16 is a diagram showing the imaging relationship when the deflecting surface of FIG. 14 is in the state B.

FIG. 16 illustrates the imaging relationship in the sub-scan section when the deflecting surface 5a of FIG. 14 is in the state B, that is, when the light beam being scanningly deflected is scanning the upper end portion of the scan surface 7.

Thus, in FIG. 16, the focal line E (position E of the focal line) of the light beam incident on the deflecting surface 5a from the left in the drawing is located before (left-hand side in the drawing) the deflecting surface 5a.

The point Q is the position where the light beam incident on the deflecting surface 5a is reflected.

Here, since the focal line E and the scan surface 7 are made conjugate with each other in the sub-scan section by the fθ lens system 6, the conjugate point in the sub-scan section of the focal line E coincides with the scan surface 7. In FIG. 16, it is illustrated as E'.

On the other hand, the conjugate point of the point Q on the deflecting surface 5a is located in the rightward direction Q' of the scan surface 7 in the drawing.

Figure 17:
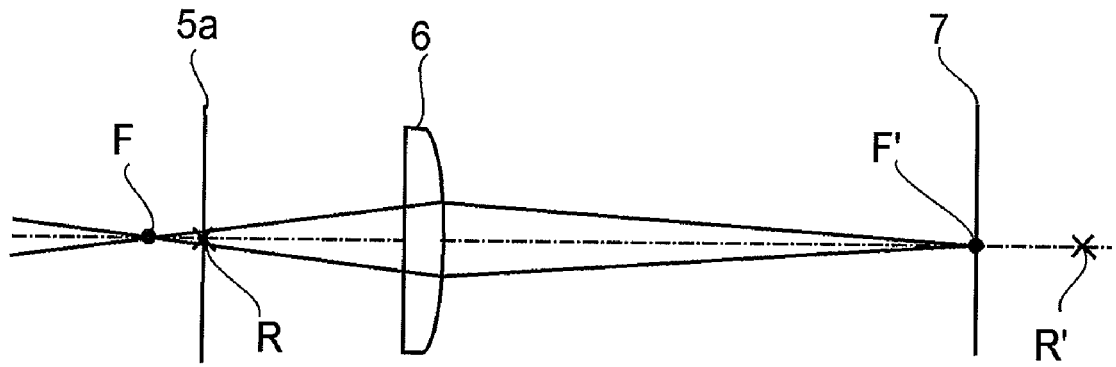
FIG. 17 is a diagram showing the imaging relationship when the deflecting surface of FIG. 14 is in the state C.

Furthermore, FIG. 17 illustrates the imaging relationship in the sub-scan section when the rotary polygonal mirror 5 of FIG. 14 is in the state C, that is, when the light beam being scanningly deflected is scanning the lower end portion of the scan surface 7.

In FIG. 17, the focal line F (position F of the focal line) of the light beam incident on the deflecting surface 5a from the left in the drawing is located before (left-hand side in the drawing) the deflecting surface 5a.

The point R is the position where the light beam incident on the deflecting surface 5a is reflected.

Here, since the focal line F and the scan surface 7 are made conjugate with each other in the sub-scan section by the fθ lens system 6, the conjugate point in the sub-scan section of the focal line F coincides with the scan surface 7.

In FIG. 17, it is illustrated as F'.

On the other hand, the conjugate point of the point R on the deflecting surface 5a is located in the rightward direction R' of the scan surface 7 in the drawing.

Figure 18:
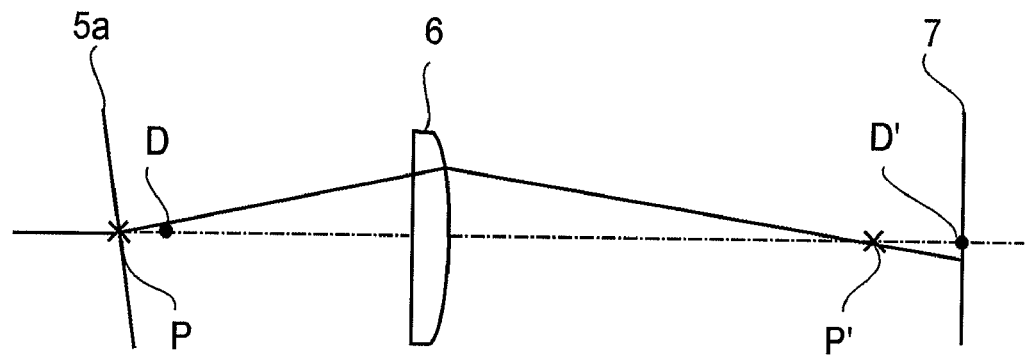
FIG. 18 is a diagram showing the state when a tilt error occurred in the deflecting surface of FIG. 15.

Here, FIG. 18 illustrates a tilt error of the deflecting surface 5a of FIG. 15, upward in the sub-scan direction, caused by a finishing error.

In FIG. 18, only the principal ray is illustrated for better understanding.

The light beam incident on the deflecting surface 5a from the left in the drawing is reflected obliquely upwardly at the point P on the deflecting surface 5a which is located at the left-hand side of the focal line D as viewed in the drawing and which has a tilt error produced upwardly in the sub-scan direction.

Then, the light beam reflected obliquely upwardly at the point P on the deflecting surface 5a is directed toward the position P' which is the conjugate point of the point P with respect to the fθ lens system 6.

Thus, the light beam reflected obliquely upwardly at the point P on the deflecting surface 5a arrives at a position on the scan surface 7 which position is deviated downwardly in the sub-scan direction as viewed in the drawing.

Figure 19:
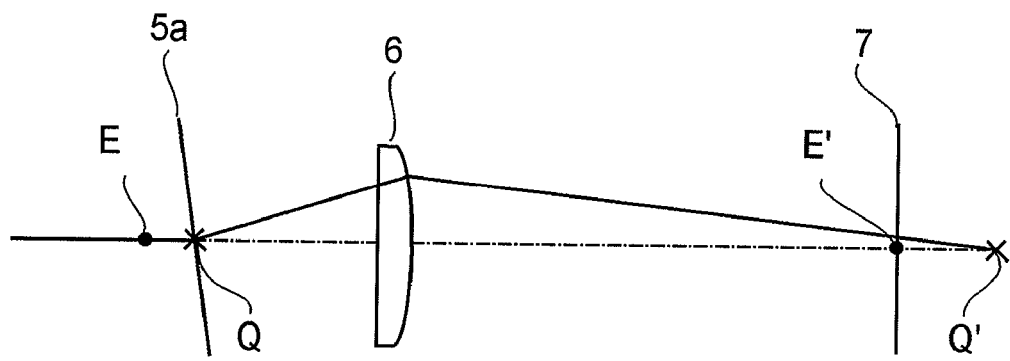
FIG. 19 is a diagram showing the state when a tilt error occurred in the deflecting surface of FIG. 16.

FIG. 19 illustrates a tilt error of the deflecting surface 5a of FIG. 16, upward in the sub-scan direction, caused by a finishing error.

In FIG. 19, like FIG. 18, only the principal ray is illustrated for better understanding.

The light beam incident on the deflecting surface 5a from the left in the drawing is reflected obliquely upwardly at the point Q on the deflecting surface 5a which is located at the right-hand side of the focal line E as viewed in the drawing and which has a tilt error produced upwardly in the sub-scan direction.

Then, the light beam reflected obliquely upwardly at the point Q on the deflecting surface 5a is directed toward the position Q' which is the conjugate point of the point P with respect to the fθ lens system 6.

Thus, the light beam reflected obliquely upwardly at the point Q on the deflecting surface 5a arrives at a position on the scan surface 7 which position is deviated upwardly in the sub-scan direction as viewed in the drawing.

Figure 20:
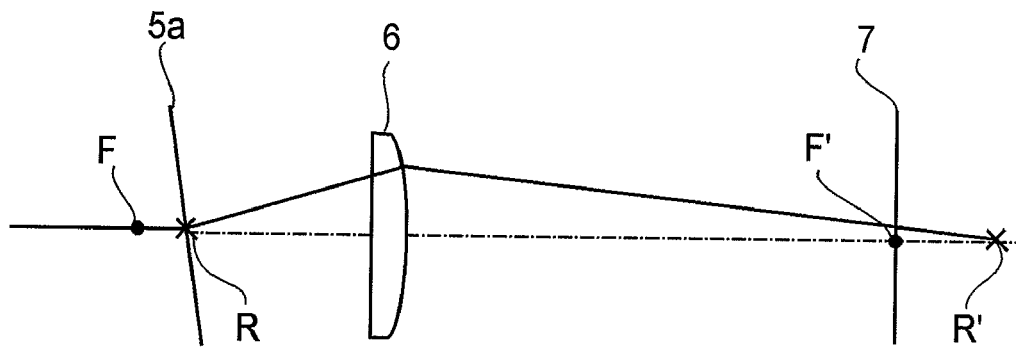
FIG. 20 is a diagram showing the state when a tilt error occurred in the deflecting surface of FIG. 17.

Furthermore, FIG. 20 illustrates a tilt error of the deflecting surface 5a of FIG. 17, upward in the sub-scan direction, caused by a finishing error.

In FIG. 20, like FIG. 18, only the principal ray is illustrated for better understanding.

The light beam incident on the deflecting surface 5a from the left in the drawing is reflected obliquely upwardly at the point R on the deflecting surface 5a which is located at the right-hand side of the focal line F as viewed in the drawing and which has a tilt error produced upwardly in the sub-scan direction.

Then, the light beam reflected obliquely upwardly at the point R on the deflecting surface 5a is directed toward the position R' which is the conjugate point of the point P with respect to the fθ lens system 6.

Thus, the light beam reflected obliquely upwardly at the point R on the deflecting surface 5a arrives at a position on the scan surface 7 which position is deviated upwardly in the sub-scan direction as viewed in the drawing.

Figure 21:
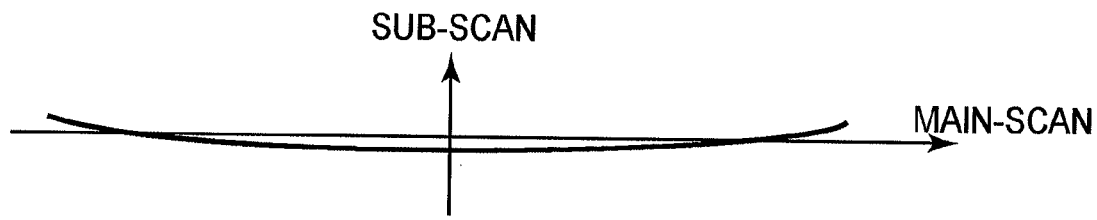
FIG. 21 is a diagram showing the state of scan line curve due to the surface tilt in an under-field type optical scanning device.

Hence, because of the phenomenon described above, the scanning line on the scan surface 7 curves such as shown in FIG. 21.

Thus, in the over-field type optical scanning device, the scan line curve due to the surface tilt of the deflecting surface 5a should be corrected like the first embodiment which concerns the under-filed type optical scanning device.

To this end, in the sub-scan section, the point on the deflecting surface and the scan surface 7 should be made conjugate in the sub-scan section with respect to the fθ lens system 6 throughout the whole effective scan region (whole scan range).

In that occasion, the image plane in the sub-scan direction will be curved toward the plus side at the scan central portion while curved toward the minus side at the scan end portion, this being reversed to the case of the under-field type optical scanning device.

Therefore, in order to obtain advantageous effects as of the first embodiment with the use of an over-field optical scanning device, at least a quartic aspherical surface term of a higher order term should be introduced into the sub-scan section shape of at least one lens surface of fθ lens system 6.

Then, at least the quartic aspherical coefficient or a higher order aspherical coefficient should be changed in dependence upon the Y-coordinate in the lens longitudinal direction of the fθ lens.

Here, the change is such that the wave surface which emerges from the fθ lens system 6 and is imaged on the scan surface as the light beam scans the scan central portion goes ahead relative to the reference spherical surface around a paraxial image point in the sub-scan direction, at the end portion in the sub-scan direction.

Furthermore, the change is such that the wave surface which emerges from the fθ lens system 6 and is imaged on the scan surface as the light beam scans the scan end portion is delayed relative to the reference spherical surface around a paraxial image point in the sub-scan direction, at the end portion in the sub-scan direction.

As an example, the fθ lens system 6 may be comprised of two pieces of lenses like the first embodiment. If a quartic aspherical surface is introduced into the lens surface of the second fθ lens 62 at the scan surface 7 side, the structure may be as follows.

Namely, the quartic aspherical coefficient at the zero image height (lens central portion) in Table 7 is set to a minus value so as to make small the absolute value of the curvature radius of the peripheral portion of the lens surface in the sub-scan section as compared with the absolute value of the curvature radius of the central portion of the lens surface in the sub-scan section.

Then, the quartic aspherical coefficient at an image height ±115 (lens peripheral portion) is set at a plus value so as to make large the absolute value of the curvature radius of the peripheral portion of the lens surface in the sub-scan section as compared with the absolute value of the curvature radius of the central portion of the lens surface in the sub-scan section. To this end, the coefficients E may be set to satisfy the following relation.

$$x = \frac{z^2/r'}{1+(1-(1+k_z)(z/r')^2)^{1/2}} + \sum_{j=0}^{10} E_j y^j z^4 + \sum_{k=0}^{10} F_k y^k z^6 + \sum_{l=0}^{10} G_l y^l z^8 + \ldots$$

It should be noted that, although in this embodiment the aspherical coefficient $F_k y^k$ and $G_1 y^1$ of sixth or higher order is zeroth order, they may have a finite value.

[Embodiment of Image Forming Apparatus]

Figure 22:
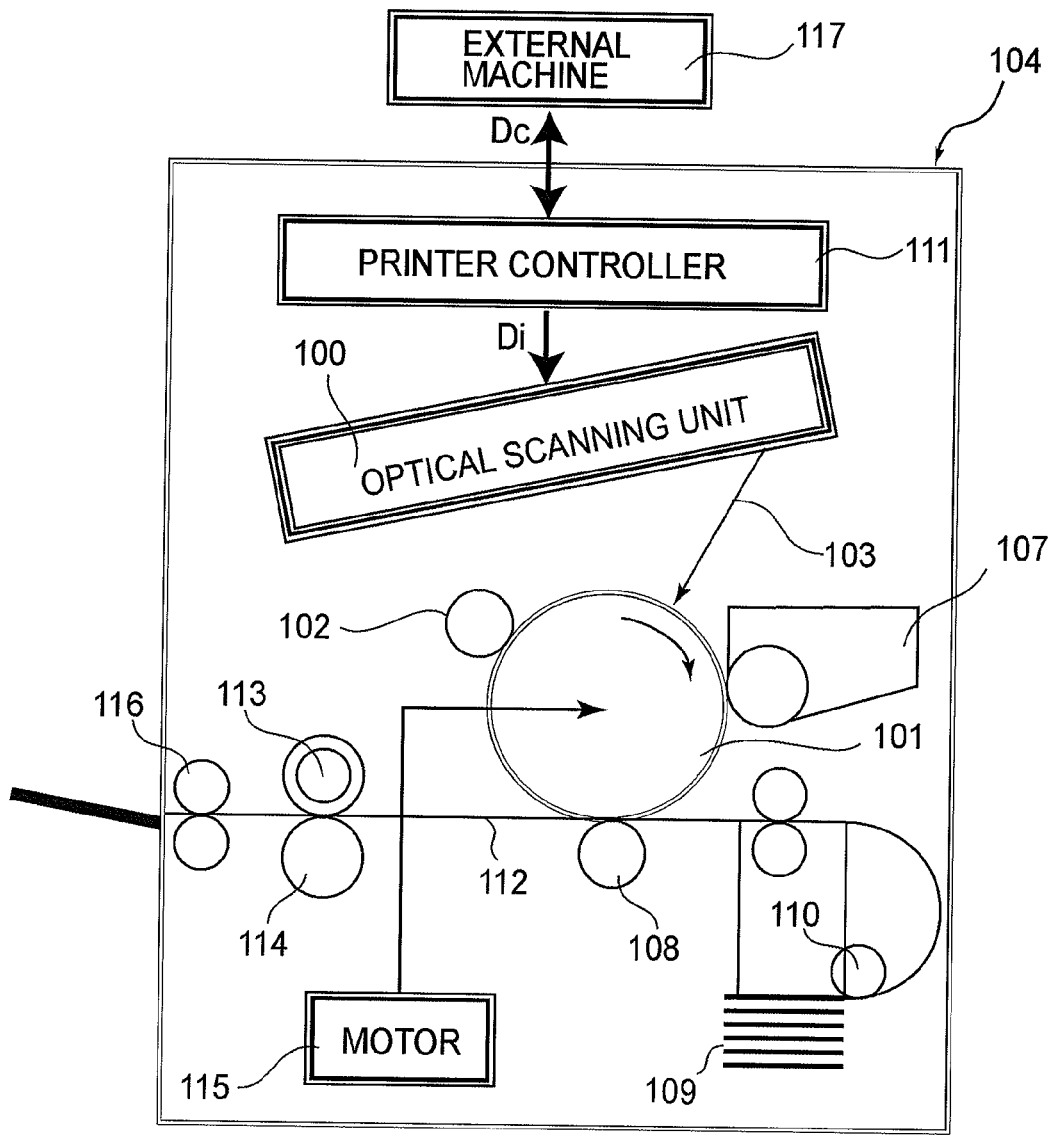
FIG. 22 is a sectional view in the sub-scan direction of a main portion of an image forming apparatus according to an embodiment of the present invention.

FIG. 22 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit (multi-beam optical scanning device) 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 15) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 22) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 22, the print controller 111 has various functions in addition to the data conversion function described hereinbefore, such as for controlling a motor 115 or any other components inside the image forming apparatus as well as a polygon motor inside the optical scanning unit (to be described later).

[Embodiment of Color Image Forming Apparatus]

Figure 23:
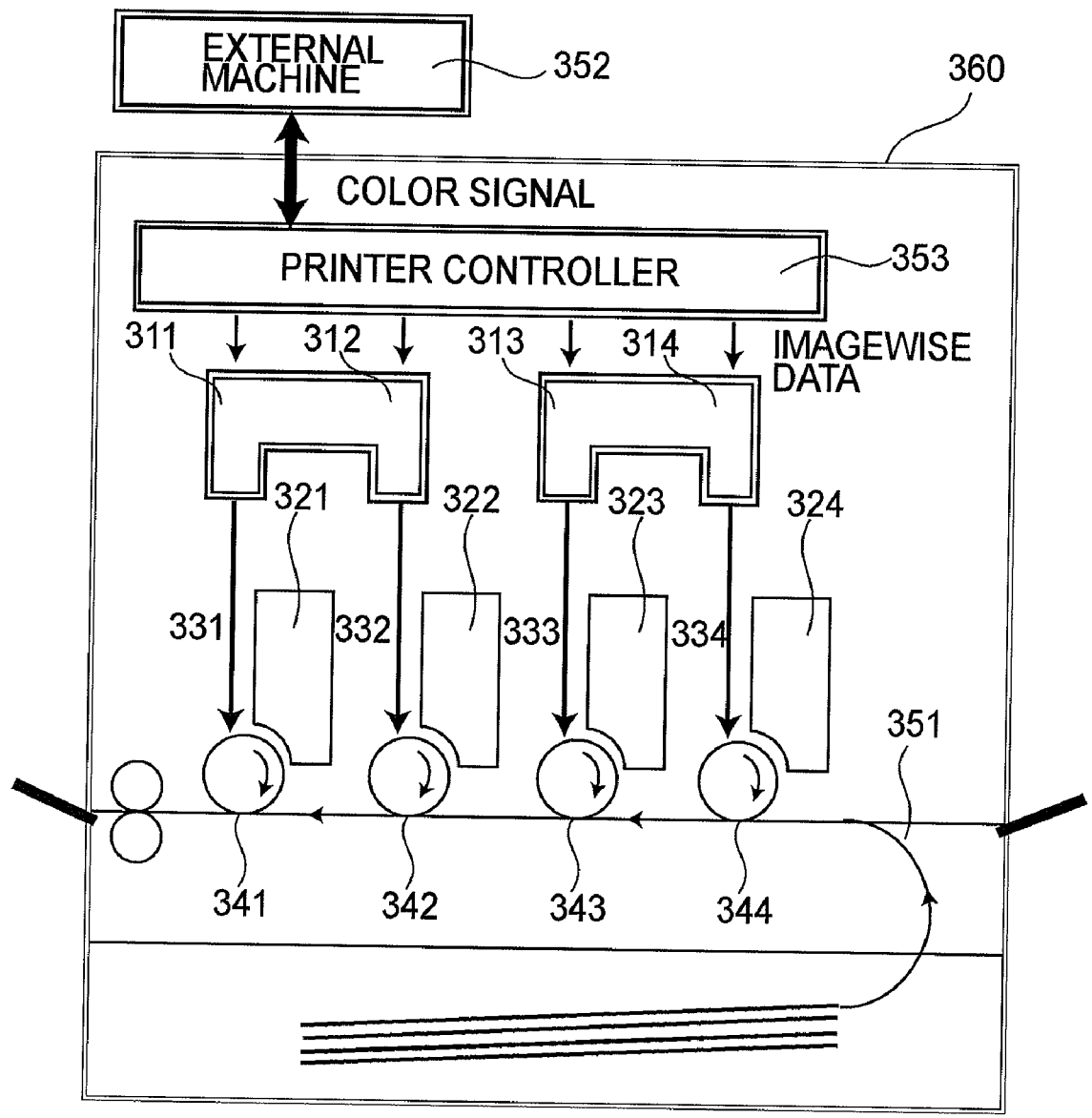
FIG. 23 is schematic diagram of a main portion of a color image forming apparatus according to an embodiment of the present invention.
Figure 24:
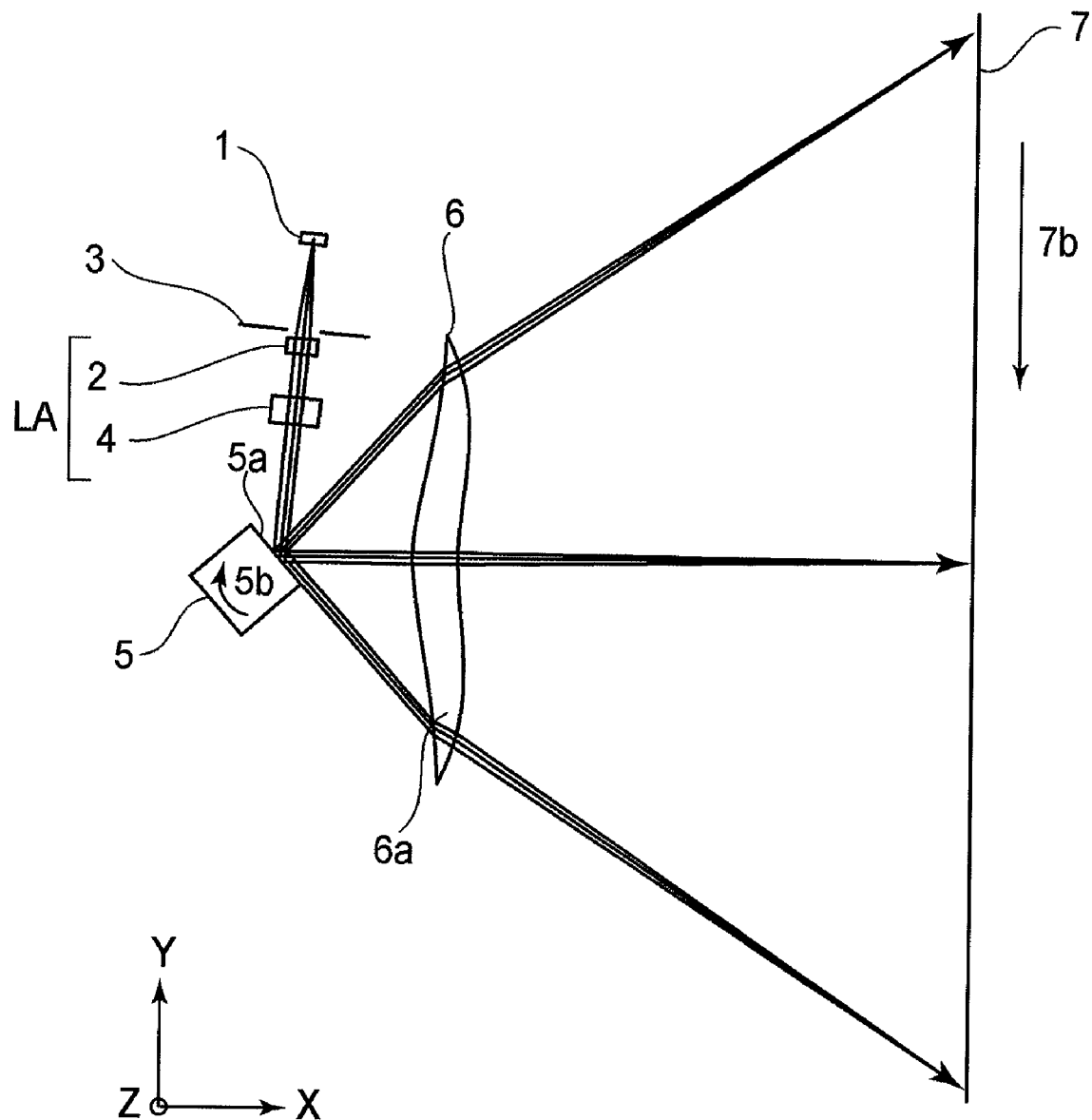
FIG. 24 is sectional view in the main-scan direction of a main portion of a conventional optical scanning device.
Figure 25:
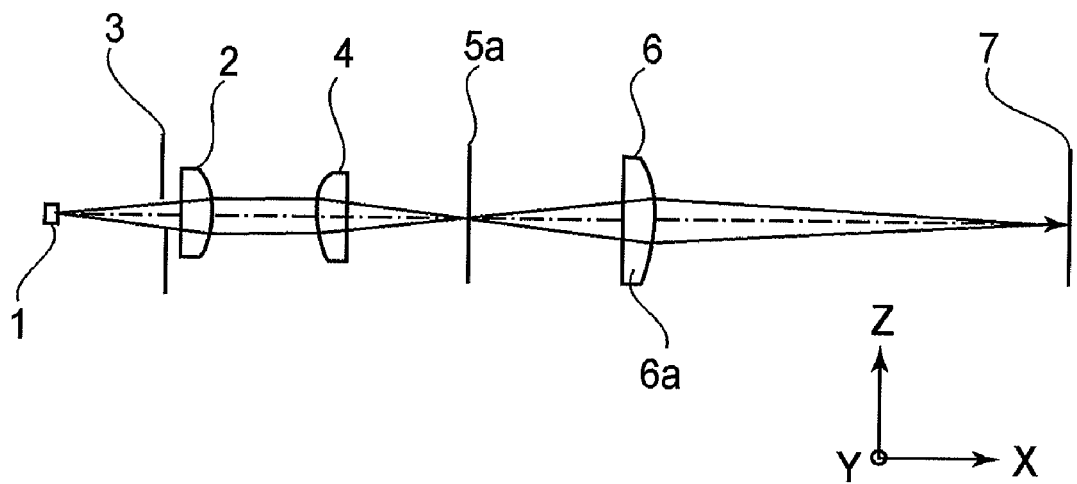
FIG. 25 is s sectional view in the sub-scan direction of a main portion of a conventional optical scanning device.
Figure 26:
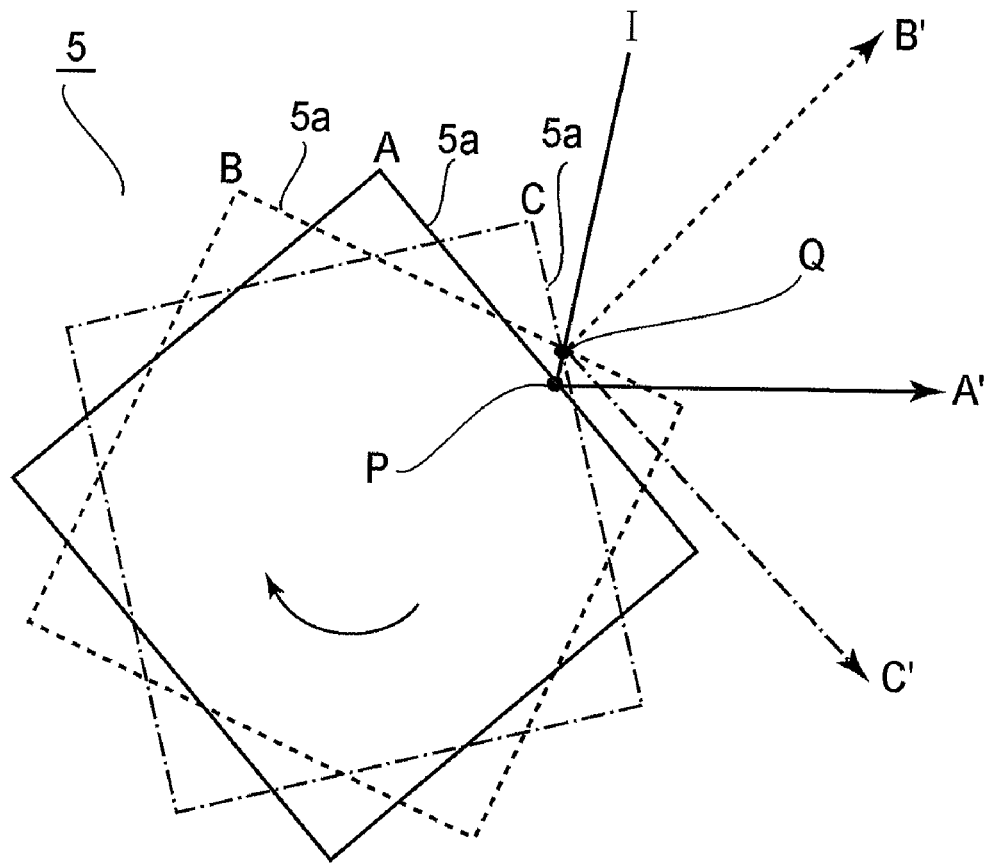
FIG. 26 is an enlarged view of a portion of a conventional optical scanning device around the deflecting surface.

FIG. 23 is a schematic view of a main portion of a color image forming apparatus according to an embodiment of the present invention. This embodiment is directed to a tandem type color image forming apparatus in which four optical scanning devices (multi-beam optical scanning devices) are provided so as to record imagewise data upon the surfaces of corresponding photosensitive drums (image bearing members) in parallel to each other.

In FIG. 23, denoted generally at 360 is a color image forming apparatus, and denoted at 311, 312, 313 and 314 are optical scanning devices having a structure according to any one of the preceding embodiments. Denoted at 341, 342, 342 and 344 are photosensitive drums (image bearing members), and denoted at 321, 322, 323 and 324 are developing devices, respectively. Denoted at 351 is a conveyance belt.

In FIG. 23, the color image forming apparatus 360 receives color signals of R (red), G (green) and B (blue) supplied thereto from an outside machine 352 such as a personal computer, for example. These color signals are transformed by means of a printer controller 353 inside the image forming apparatus, into imagewise data (dot data) corresponding to C (cyan), M (magenta), Y (yellow) and B (black).

These imagewise data are inputted into the optical scanning devices 311, 312, 313 and 314, respectively. In response, these optical scanning devices produce light beams 331, 332, 333 and 334 having been modulated in accordance with the associated imagewise data. Through these light beams, the photosensitive surfaces of the photosensitive drums 341, 342, 342 and 344 are scanned in the main-scan direction.

In the color image forming apparatus of this embodiment, two pairs of optical scanning devices (311, 312) and (313, 314) are provided and these correspond to colors of C (cyan), M (magenta), Y (yellow) and B (black), respectively. These scanning devices are operable in parallel to each other to record imagewise signals upon the surfaces of the photosensitive drums 341, 342, 342 and 344, respectively, so that a color image can be printed at high speed.

As described, the color image forming apparatus of this embodiment uses four optical scanning devices 311, 312, 313 and 314 to produce latent images for different colors upon the surfaces of corresponding photosensitive drums 341, 342, 342 and 344, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-175909 filed Jul. 4, 2007, for which is hereby incorporated by reference.

What is claimed is:

1. An optical scanning device, comprising:
   a light source device;
   a rotary polygonal mirror having a plurality of deflecting surfaces configured to scanningly deflect a light beam emitted from a light emitting member of said light source device;
   an input optical system configured to direct the light beam emitted from the light emitting member of said light source device to a deflecting surface of said rotary polygonal mirror; and
   an imaging optical system configured to image the light beam scanningly deflected by the deflection surface of said rotary polygonal mirror, on a scan surface to be scanned;
   wherein in a sub-scan section the deflecting surface of said rotary polygonal mirror and the scan surface are placed in a conjugate relationship with each other,
   wherein in a main scan section the light beam incident on the deflecting surface of said rotary polygonal mirror has a beam width narrower than a width of the deflecting surface of said rotary polygonal mirror,
   wherein said imaging optical system includes at least one imaging optical element and wherein at least one optical surface of said at least one imaging optical element has a shape in the sub-scan section which shape comprises a non-arcuate shape including an aspherical coefficient of quartic or higher order,
   wherein the aspherical coefficient of quartic or higher order changes in the main-scan direction and from a scan central portion of the imaging optical element to a scan end portion of the imaging optical element,
   wherein, in the non-arcuate shape of the imaging optical element in the sub-scan section and at the scan central portion in the main-scan direction, an absolute value of a curvature radius at an end portion of the imaging optical element in the sub-scan direction is larger than an absolute value of a curvature radius at a central portion of the imaging optical element in the sub-scan direction, and
   wherein, in the non-arcuate shape of the imaging optical element in the sub-scan section and at the scan end portion in the main-scan direction, an absolute value of the curvature radius at the end portion of the imaging optical element in the sub-scan direction is smaller than the absolute value of the curvature radius at the central portion of the imaging optical element in the sub-scan direction.

2. An optical scanning device according to claim 1, wherein said light source device includes at least two light emitting members.

3. An optical scanning device according to claim 1, wherein said light source device includes a plurality of light source members each having at least one light emitting member, and wherein said optical scanning device further comprises a beam combining device for directing light beams emitted from said plurality of light source members in the same direction.

4. An optical scanning device according to claim 1, wherein in the sub-scan section the light beam incident on the deflecting surface of said rotary polygonal mirror is being incident from an oblique direction relative to a plane perpendicular to a rotational axis of the deflecting surface of said rotary polygonal mirror.

5. An optical scanning device according to claim 1, wherein in the sub-scan section the deflecting surface of said rotary polygonal mirror and the scan surface are placed in a conjugate relationship with each other, throughout the whole scan range.

6. An image forming apparatus, comprising:
   an optical scanning device as recited in claim 1;
   a photosensitive member disposed at the scan surface to be scanned;

a developing device for developing an electrostatic latent image formed on said photosensitive member with a light beam scanningly deflected by said optical scanning device, to produce a toner image;

a transferring device for transferring the developed toner image onto a transfer material; and a fixing device for fixing the transferred toner image, on the transfer material.

7. An image forming apparatus, comprising:

an optical scanning device as recited in claim 1; and a printer controller for converting code data supplied from an outside machine into an imagewise signal and for inputting the imagewise signal into said optical scanning device.

8. An optical scanning device, comprising:

a light source device;

a rotary polygonal mirror having a plurality of deflecting surfaces configured to scanningly deflect a light beam emitted from a light emitting member of said light source device;

an input optical system configured to direct the light beam emitted from the light emitting member of said light source device to a deflecting surface of said rotary polygonal mirror; and an imaging optical system configured to image the light beam scanningly deflected by the deflection surface of said rotary polygonal mirror, on a scan surface to be scanned;

wherein in a sub-scan section the deflecting surface of said rotary polygonal mirror and the scan surface are placed in a conjugate relationship with each other, wherein in a main scan section the light beam incident on the deflecting surface of said rotary polygonal mirror has a beam width narrower than a width of the deflecting surface of said rotary polygonal mirror, wherein said imaging optical system includes at least one imaging optical element and wherein at least one optical surface of said at least one imaging optical element has a shape in the sub-scan section which shape comprises a non-arcuate shape including an aspherical coefficient of quartic or higher order, wherein the aspherical coefficient of quartic or higher order changes in dependence upon a coordinate of the imaging optical element in the main-scan direction, wherein the change is such that a wave surface imaged on the scan surface in the sub-scan section when a scan central portion of the scan surface in the main-scan direction is scanned is delayed at an end portion in the sub-scan direction and with respect to an advancement direction of the wave surface, relative to a reference spherical surface around a paraxial image point in the sub-scan direction, and wherein the change is such that the wave surface imaged on the scan surface in the sub-scan section when a scan end portion of the scan surface in the main-scan direction is scanned goes ahead at the end portion in the sub-scan direction and with respect to the advancement direction of the wave surface, relative to the reference spherical surface around the paraxial image point in the sub-scan direction.

9. An optical scanning device according to claim 8, wherein said light source device includes at least two light emitting members.

10. An optical scanning device according to claim 8, wherein said light source device includes a plurality of light source members each having at least one light emitting member, and wherein said optical scanning device further comprises a beam combining device for directing light beams emitted from said plurality of light source members in the same direction.

11. An optical scanning device according to claim 8, wherein in the sub-scan section the light beam incident on the deflecting surface of said rotary polygonal mirror is being incident from an oblique direction relative to a plane perpendicular to a rotational axis of the deflecting surface of said rotary polygonal mirror.

12. An optical scanning device according to claim 8, wherein in the sub-scan section the deflecting surface of said rotary polygonal mirror and the scan surface are placed in a conjugate relationship with each other, throughout the whole scan range.

13. An image forming apparatus, comprising:

an optical scanning device as recited in claim 8;

a photosensitive member disposed at the scan surface to be scanned;

a developing device for developing an electrostatic latent image formed on said photosensitive member with a light beam scanningly deflected by said optical scanning device, to produce a toner image;

a transferring device for transferring the developed toner image onto a transfer material; and a fixing device for fixing the transferred toner image, on the transfer material.

14. An image forming apparatus, comprising:

an optical scanning device as recited in claim 8; and a printer controller for converting code data supplied from an outside machine into an imagewise signal and for inputting the imagewise signal into said optical scanning device.

15. An optical scanning device, comprising:

a light source device;

a rotary polygonal mirror having a plurality of deflecting surfaces configured to scanningly deflect a light beam emitted from a light emitting member of said light source device;

an input optical system configured to direct the light beam emitted from the light emitting member of said light source device to a deflecting surface of said rotary polygonal mirror; and an imaging optical system configured to image the light beam scanningly deflected by the deflection surface of said rotary polygonal mirror, on a scan surface to be scanned;

wherein in a sub-scan section the deflecting surface of said rotary polygonal mirror and the scan surface are placed in a conjugate relationship with each other, wherein in a main scan section the light beam incident on the deflecting surface of said rotary polygonal mirror has a beam width wider than a width of the deflecting surface of said rotary polygonal mirror, wherein said imaging optical system includes at least one imaging optical element and wherein at least one optical surface of said at least one imaging optical element has a shape in the sub-scan section which shape comprises a non-arcuate shape including an aspherical coefficient of quartic or higher order, wherein the aspherical coefficient of quartic or higher order changes in the main-scan direction and from a scan central portion of the imaging optical element to a scan end portion of the imaging optical element, wherein, in the non-arcuate shape of the imaging optical element in the sub-scan section and at the scan central portion in the main-scan direction, an absolute value of a curvature radius at an end portion of the imaging optical element in the sub-scan direction is smaller than an absolute value of a curvature radius at a central portion of the imaging optical element in the sub-scan direction, and wherein, in the non-arcuate shape of the imaging optical element in the sub-scan section and at the scan end portion in the main-scan direction, an absolute value of the curvature radius at the end portion of the imaging optical element in the sub-scan direction is larger than the absolute value of the curvature radius at the central portion of the imaging optical element in the sub-scan direction.

16. An optical scanning device according to claim 15, wherein said light source device includes at least two light emitting members.

17. An optical scanning device according to claim 15, wherein said light source device includes a plurality of light source members each having at least one light emitting member, and wherein said optical scanning device further comprises a beam combining device for directing light beams emitted from said plurality of light source members in the same direction.

18. An optical scanning device according to claim 15, wherein in the sub-scan section the light beam incident on the deflecting surface of said rotary polygonal mirror is being incident from an oblique direction relative to a plane perpendicular to a rotational axis of the deflecting surface of said rotary polygonal mirror.

19. An optical scanning device according to claim 15, wherein in the sub-scan section the deflecting surface of said rotary polygonal mirror and the scan surface are placed in a conjugate relationship with each other, throughout the whole scan range.

20. An image forming apparatus, comprising:
an optical scanning device as recited in claim 15;
a photosensitive member disposed at the scan surface to be scanned;
a developing device for developing an electrostatic latent image formed on said photosensitive member with a light beam scanningly deflected by said optical scanning device, to produce a toner image;
a transferring device for transferring the developed toner image onto a transfer material; and
a fixing device for fixing the transferred toner image, on the transfer material.

21. An image forming apparatus, comprising:
an optical scanning device as recited in claim 15; and
a printer controller for converting code data supplied from an outside machine into an imagewise signal and for inputting the imagewise signal into said optical scanning device.

22. An optical scanning device, comprising:
a light source device;
a rotary polygonal mirror having a plurality of deflecting surfaces configured to scanningly deflect a light beam emitted from a light emitting member of said light source device;
an input optical system configured to direct the light beam emitted from the light emitting member of said light source device to a deflecting surface of said rotary polygonal mirror; and
an imaging optical system configured to image the light beam scanningly deflected by the deflection surface of said rotary polygonal mirror, on a scan surface to be scanned;

wherein in a sub-scan section the deflecting surface of said rotary polygonal mirror and the scan surface are placed in a conjugate relationship with each other, wherein in a main scan section the light beam incident on the deflecting surface of said rotary polygonal mirror has a beam width wider than a width of the deflecting surface of said rotary polygonal mirror, wherein said imaging optical system includes at least one imaging optical element and wherein at least one optical surface of said at least one imaging optical element has a shape in the sub-scan section which shape comprises a non-arcuate shape including an aspherical coefficient of quartic or higher order, wherein the aspherical coefficient of quartic or higher order changes in dependence upon a coordinate of the imaging optical element in the main-scan direction, wherein the change is such that a wave surface imaged on the scan surface in the sub-scan section when a scan central portion of the scan surface in the main-scan direction is scanned goes ahead at an end portion in the sub-scan direction and with respect to an advancement direction of the wave surface, relative to a reference spherical surface around a paraxial image point in the sub-scan direction, and wherein the change is such that the wave surface imaged on the scan surface in the sub-scan section when a scan end portion of the scan surface in the main-scan direction is scanned is delayed at the end portion in the sub-scan direction and with respect to the advancement direction of the wave surface, relative to the reference spherical surface around the paraxial image point in the sub-scan direction.

23. An optical scanning device according to claim 22, wherein said light source device includes at least two light emitting members.

24. An optical scanning device according to claim 22, wherein said light source device includes a plurality of light source members each having at least one light emitting member, and wherein said optical scanning device further comprises a beam combining device for directing light beams emitted from said plurality of light source members in the same direction.

25. An optical scanning device according to claim 22, wherein in the sub-scan section the light beam incident on the deflecting surface of said rotary polygonal mirror is being incident from an oblique direction relative to a plane perpendicular to a rotational axis of the deflecting surface of said rotary polygonal mirror.

26. An optical scanning device according to claim 22, wherein in the sub-scan section the deflecting surface of said rotary polygonal mirror and the scan surface are placed in a conjugate relationship with each other, throughout the whole scan range.

27. An image forming apparatus, comprising:
an optical scanning device as recited in claim 22;
a photosensitive member disposed at the scan surface to be scanned;
a developing device for developing an electrostatic latent image formed on said photosensitive member with a light beam scanningly deflected by said optical scanning device, to produce a toner image;
a transferring device for transferring the developed toner image onto a transfer material; and
a fixing device for fixing the transferred toner image, on the transfer material.

28. An image forming apparatus, comprising:
an optical scanning device as recited in claim 22; and a printer controller for converting code data supplied from an outside machine into an imagewise signal and for inputting the imagewise signal into said optical scanning device.

* * * * *